(12) United States Patent
Kanai et al.

(10) Patent No.: US 7,662,888 B2
(45) Date of Patent: Feb. 16, 2010

(54) POLYPROPYLENE BASED HEAT SHRINKABLE FILM

(75) Inventors: Gen Kanai, Yokkaichi (JP); Kuninori Takahashi, Yokkaichi (JP); Shinichi Kitade, Yokkaichi (JP); Iku Kouzai, Yokkaichi (JP)

(73) Assignee: Japan Polypropylene Corporation, Tokyo (JP)

( * ) Notice: Subject to any disclaimer, the term of this patent is extended or adjusted under 35 U.S.C. 154(b) by 209 days.

(21) Appl. No.: 11/410,074

(22) Filed: Apr. 25, 2006

(65) Prior Publication Data

US 2006/0246308 A1    Nov. 2, 2006

(30) Foreign Application Priority Data

Apr. 29, 2005  (JP)  ............................. 2005-160370
Apr. 29, 2005  (JP)  ............................. 2005-160371

(51) Int. Cl.
*C08F 297/00* (2006.01)
(52) U.S. Cl. ........................................ 525/271; 526/72
(58) Field of Classification Search ................. 525/271; 526/72

See application file for complete search history.

(56) References Cited

U.S. PATENT DOCUMENTS

| | | | |
|---|---|---|---|
| 4,786,562 A * | 11/1988 | Kakugo et al. .............. | 428/516 |
| 2002/0064611 A1 * | 5/2002 | Kanai et al. ................. | 428/34.1 |
| 2002/0193527 A1 | 12/2002 | Nakata et al. | |

(Continued)

FOREIGN PATENT DOCUMENTS

EP    0 942 020 A1    9/1999

(Continued)

*Primary Examiner*—Randy Gulakowski
*Assistant Examiner*—Alicia M Toscano
(74) *Attorney, Agent, or Firm*—Oblon, Spivak, McClelland, Maier & Neustadt, L.L.P.

(57) ABSTRACT

A polypropylene based heat shrinkable film obtained by using a propylene-ethylene block copolymer (A) which satisfies the following requirements (A-i) to (A-iv), and having heat shrinkability imparted by orientation in at least one direction:

(A-i) it is a propylene-ethylene block copolymer obtained through sequential polymerization catalyzed by a metallocene catalyst which is composed of 30 to 95 wt % of a propylene homopolymer or propylene-ethylene random copolymer component (A1) having an ethylene content of at most 7 wt % produced in a first step and 70 to 5 wt % of a propylene-ethylene random copolymer component (A2) produced in a second step having an ethylene content higher by 3 to 20 wt % than that of the component (A1);

(A-ii) it has a melt flow rate (MFR: 2.16 kg, 230° C.) within a range of 0.1 to 30 g/10 min;

(A-iii) a temperature-loss tangent (tan δ) curve obtained by dynamic mechanical analysis (DMA) has a single peak at a temperature of at most 0° C.;

(A-iv) in a temperature rising elution fractionation (TREF) curve obtained as a plot of an elution amount (dwt %/dT) to a temperature by means of temperature rising elution fractionation (TREF) using an o-dichlorobenzene solvent in a temperature range of −15° C. to 140° C., a peak temperature T(A1) observed at a high temperature side is within a range of 60° C. to 88° C., a peak temperature T(A2) observed at a low temperature side is at most 40° C. or a peak temperature T(A2) is not observed, and a temperature T(A4) at which 99 wt % of the total amount of the propylene-ethylene block copolymer is eluted is less than 90° C.

14 Claims, 3 Drawing Sheets

U.S. PATENT DOCUMENTS

2004/0010087 A1 * 1/2004 Obata et al. .............. 525/240
2004/0198912 A1   10/2004 Dharmarajan et al.

FOREIGN PATENT DOCUMENTS

| EP | 1 588 843 A1   | 10/2005 |
| EP | 1588843 A1 *   | 10/2005 |
| EP | 1 593 708 A1   | 11/2005 |
| JP | 8-244182       | 9/1996  |
| JP | 2000-239462    | 9/2000  |
| WO | WO 98/10016    | 3/1998  |
| WO | WO 02/070572 A2 | 9/2002 |
| WO | WO 03/076510 A1 | 9/2003 |
| WO | WO 03/106523 A1 | 12/2003 |
| WO | WO 03106523 A1 * | 12/2003 |
| WO | WO 2004/072174 A1 | 8/2004 |

* cited by examiner

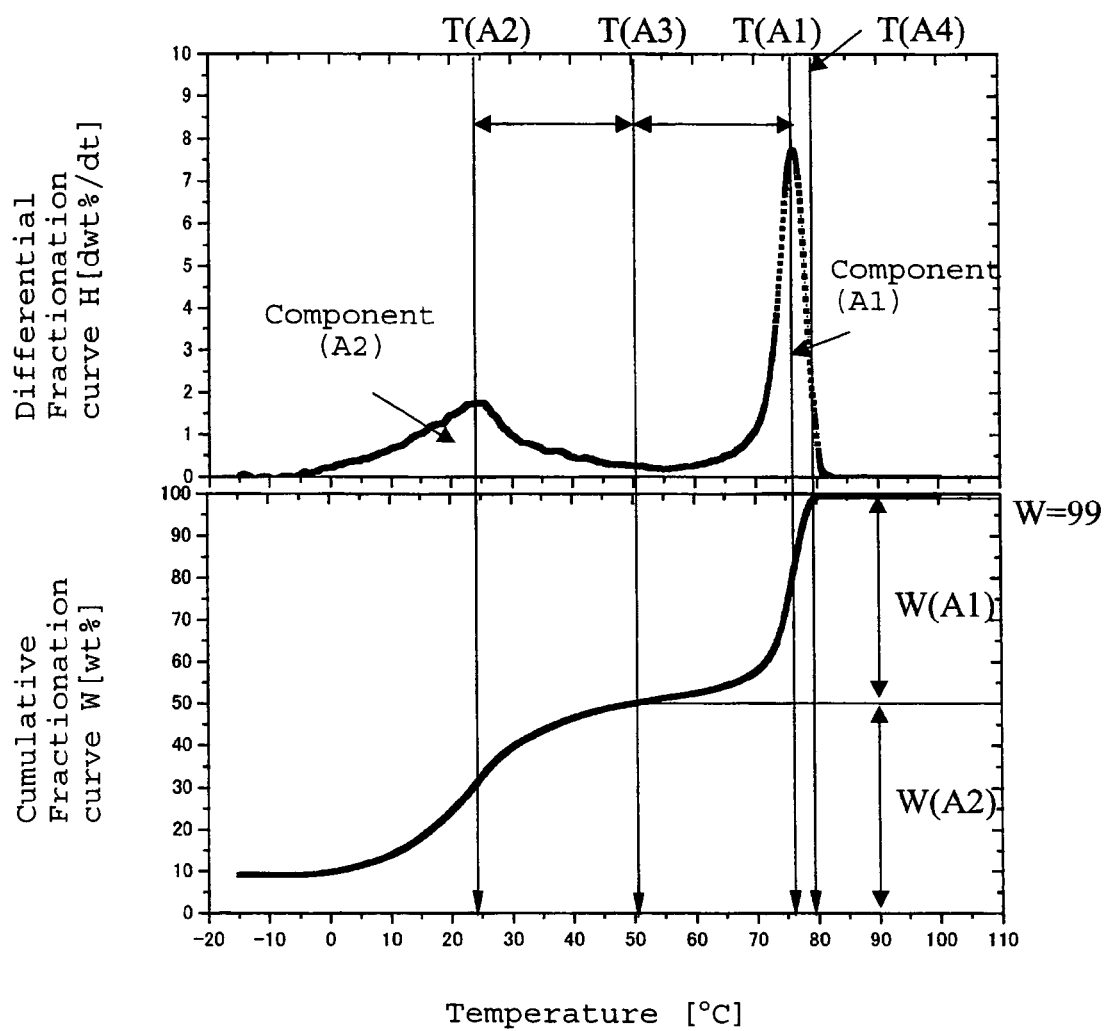

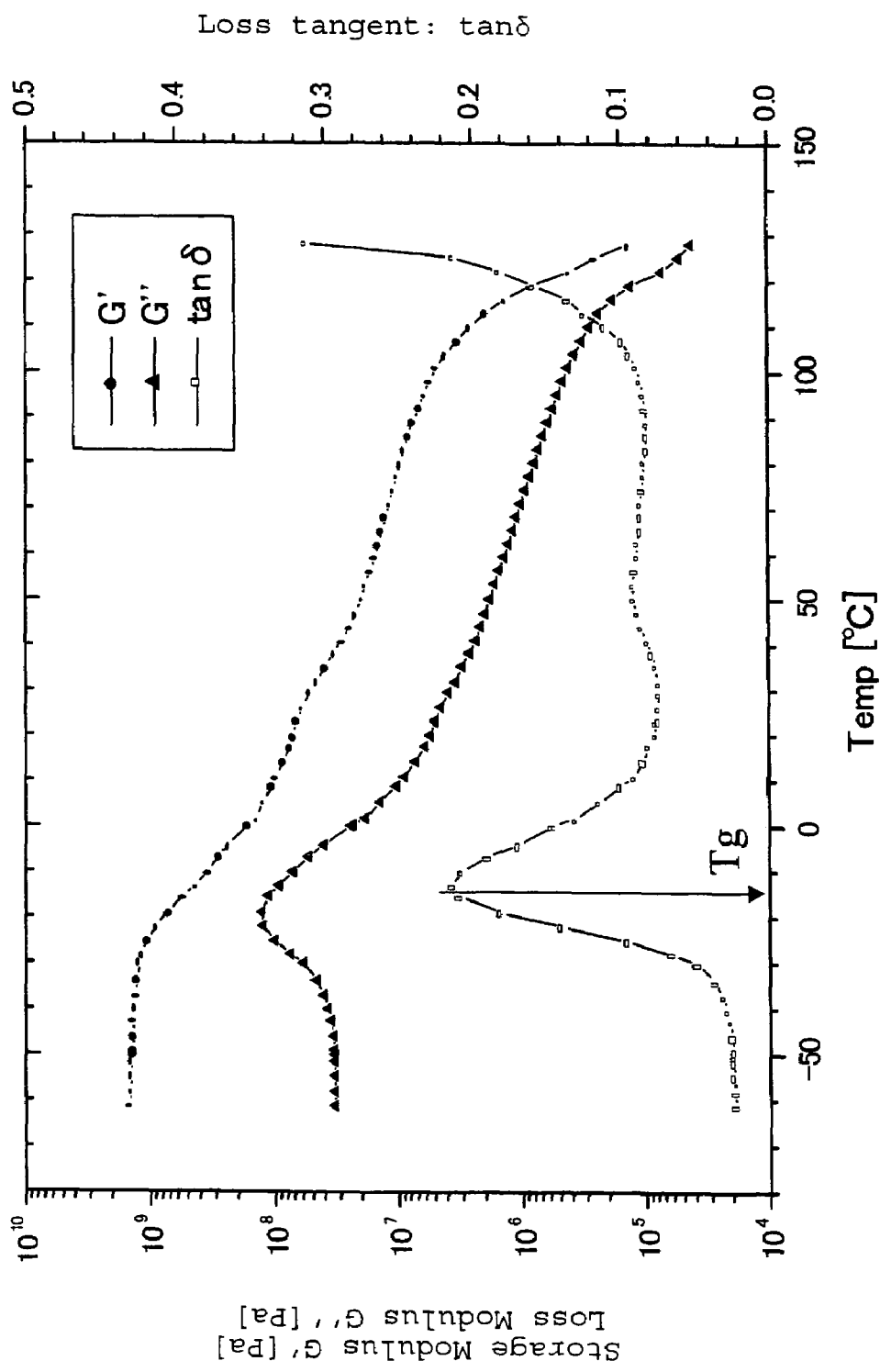
Fig.2 DMA result (PP-1)

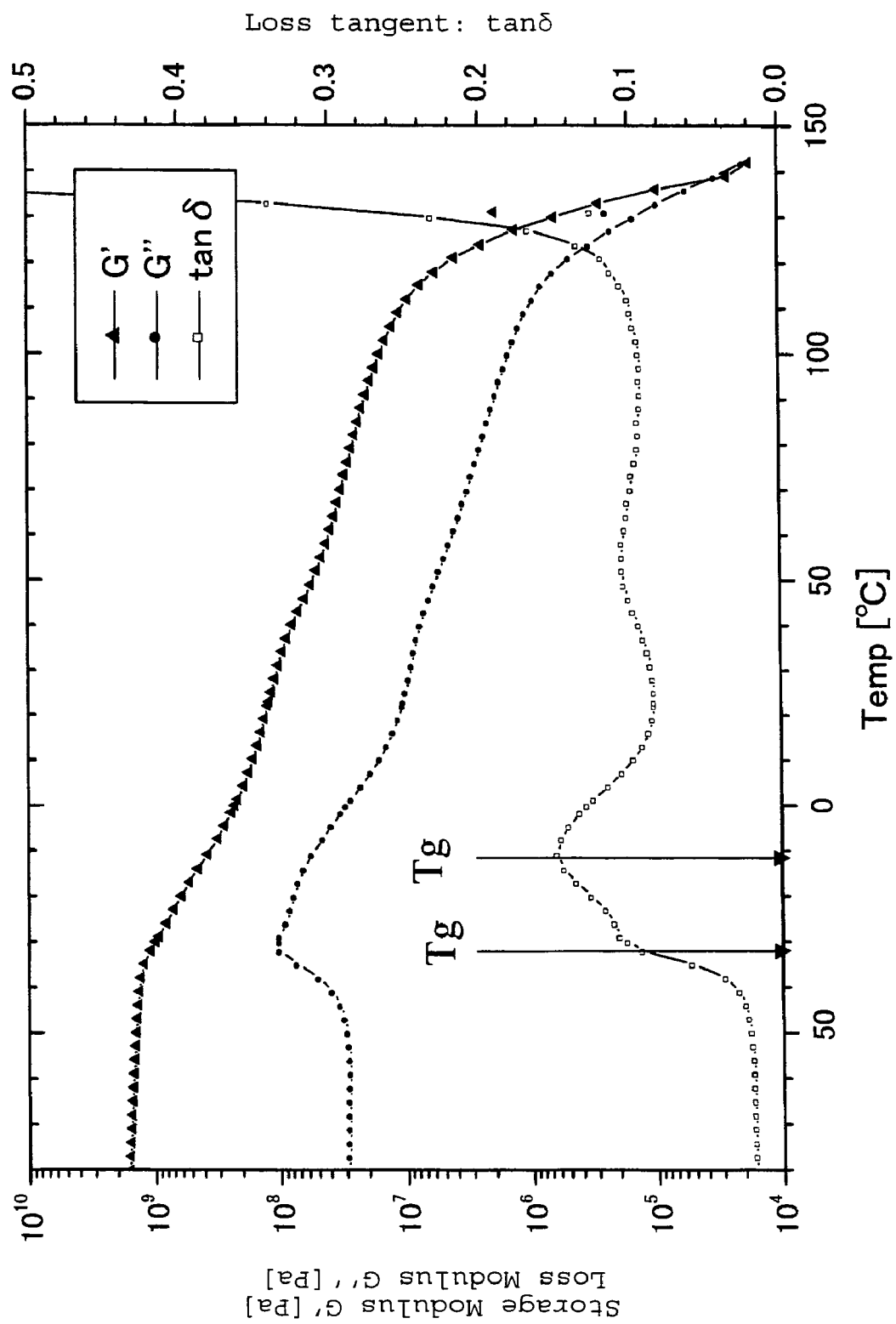

POLYPROPYLENE BASED HEAT SHRINKABLE FILM

The present invention relates to a polypropylene based heat shrinkable film. Particularly, it relates to a polypropylene based heat shrinkable film having characteristics of a propylene based heat shrinkable film such as excellent outer appearance of a film such as transparency and gloss, and heat resistance, and further having reduced stickiness, bleeding and blocking and thereby being excellent in handling, having a high heat shrinkage after, having high impact resistance, and being flexible after shrinkage and thereby safe even when it has a thick corner.

Heat shrinkable films are widely used for outer packaging for the purpose of preventing breakage and dirt on the content, preventing manipulation and improving display properties, and for product accumulated packaging for the purpose of improvement in transport efficiency and sales promotion.

Among such heat shrinkable films (shrink films), a polypropylene based shrink film has high transparency and gloss and is thereby excellent in outer appearance, and is excellent in heat resistance and rigidity.

Heretofore, as a polypropylene resin for a heat shrinkable film, a propylene-ethylene random copolymer has been mainly used from the viewpoint of transparency and shrinkage factor. However, a conventional propylene-ethylene random copolymer is produced employing a Ziegler-Natta catalyst, it has broad distributions in crystallinity and molecular weight and is thereby unsatisfactory in view of stickiness, blocking and bleeding, and its shrinkage factor is also unsatisfactory.

In recent years, a method of employing a crystalline propylene-α-olefin random copolymer showing a specific heat fusion behavior, having narrow crystallinity and molecular weight distributions, produced employing a metallocene catalyst (JP-A-2001-240711) has been proposed, whereby stickiness, blocking and bleeding have been reduced, and improvement in shrinkage characteristics has been attempted.

However, a conventional polypropylene based shrink film, which is poor in impact resistance, is not suitable for packaging heavy products, etc., and since it has high rigidity, it may cut the hand when formed into e.g. a bag having a thick corner.

Regarding improvement in impact resistance and impartment of flexibility, a means of blending a resin excellent in impact resistance such as an elastomer has been employed in general, and utilization of a film obtained in such a manner has been increasing.

Such a resin is blended usually by addition at the time of molding, melt kneading by an extruder or multi-stage polymerization. A so-called block type reactor TPO, produced in such a manner that a crystalline polypropylene is produced in a first step and a propylene-ethylene copolymer elastomer is produced in a second step, is excellent in heat resistance and productivity as compared with a random copolymer type elastomer, and is advantageous over an elastomer to be produced by mechanical mixing, in view of stabilized quality of products, a reduced production cost and a wide variety of elastomer compositions. Thus, it is highly economical and is very widely used in recent years.

However, many of such copolymers have such drawbacks that a crystalline polypropylene produced in the first step and a propylene-ethylene copolymer elastomer produced in the second step undergo phase separation, they are insufficient in transparency even in the form of an oriented film, and further, they have very poor transparency after shrinkage, such impairs outer appearance of the products. Further, by the phase separation, films are likely to be torn at the interference, and their impact resistance is hardly sufficient.

Thus, required performance such as transparency cannot sufficiently be met even if a shrink film is produced by employing the above materials.

For improvement in view of resin materials, in order to improve flexibility and dissolve deterioration of transparency, a means of continuous polymerization catalyzed by a Ziegler-Natta catalyst to produce a polypropylene or a propylene-ethylene copolymer having a low ethylene content in a first step and a propylene-ethylene copolymer elastomer having an ethylene content which is higher than that in the first step but is relatively low, in a second step, has been disclosed (JP-A-63-159412). However, since the Ziegler-Natta catalyst has a plurality of active sites, a propylene-ethylene copolymer to be produced has broad crystallinity and molecular weight distributions and contains low crystalline and low molecular weight components in a large amount, and when it is used for a shrink film, stickiness and bleeding (exudation of low molecular weight components, additives, etc.) are significant on the film and the film has drawbacks such as blocking and outer appearance failure, and is thereby hardly used as a product.

Further, for improvement in view of resin materials, a means of increasing the intrinsic viscosity i.e. the molecular weight of the elastomer at least to a certain extent so as to suppress formation of low molecular weight components has been disclosed (JP-A-9-324022). However, even if the molecular weight is increased, the effect of suppressing formation of low crystalline components is small, the film to be obtained will not have sufficient transparency and still have stickiness and bleeding. Further, as the elastomer has a high molecular weight, the film is likely to have outer appearance failure such as blobbing and fisheyes, and it has many drawbacks such that the film is likely to be torn at the time of orientation.

As described above, no polypropylene based heat shrinkable film which satisfies all of transparency, heat resistance, low degree of stickiness and blocking resistance, and further, impact resistance and flexibility, has been achieved. Under these circumstances, it is an object of the present invention to develop a polypropylene based heat shrinkable film having characteristics of a polypropylene resin such as excellent outer appearance of a film, such as transparency and gloss, and high heat resistance, and further having reduced stickiness, bleeding and blocking and thereby being excellent in handling, having an improved heat shrinkage factor, being excellent in impact resistance and being excellent in flexibility after shrinkage and thereby safe even when it has a corner or the like.

The present inventors have conducted a series of research and development on a propylene-ethylene block copolymer having specific component composition, molecular weight distribution and composition distribution, and having intrinsic viscosity characteristics and elution characteristics in temperature rising elution fractionation, produced by multi-stage polymerization employing a metallocene catalyst, and filed previous applications (Japanese Patent Application No. 2003-371458, etc.). In order to develop a polypropylene based heat shrinkable film having various improved properties, which is the above-described object of the present invention, and to utilize a propylene-ethylene block copolymer which is a block type reactor TPO as a film material, the present inventors have conducted extensive studies to obtain a new means, employing the above previous applications, to realize a polypropylene based heat shrinkable film having characteristics of a polypropylene resin such as excellent outer appearance of a film such as transparency and gloss, and high heat resistance, and further having reduced stickiness, bleeding and blocking and being thereby excellent in handling, having an improved heat shrinkage factor, being excellent in impact resistance, and being excellent in flexibility after shrinkage and thereby being safe even if it has a corner or the like, employing as a material a propylene-ethylene block copolymer disclosed in the above previous applications.

To find such a means, the present inventors have made multilateral consideration on the component composition, the ethylene content, the crystallinity distribution and the molecular weight distribution of each copolymer, the intrinsic viscosity characteristics and the elution characteristics in temperature rising elution fractionation, the melt flow rate and the melting temperature as measured by DSC, etc., regarding a propylene-ethylene block copolymer obtained by sequential polymerization catalyzed by a metallocene catalyst to produce a propylene homopolymer or propylene-ethylene random copolymer component having a low ethylene content in a first step and a propylene-ethylene random copolymer component having a higher ethylene component than that in the first step. Further, they have conducted multilateral trails in view of the above conditions and as a result, they have nearly found requirements to achieve the above object of the present invention and achieved the invention.

As the basic requirements, in a propylene-ethylene block copolymer obtained by sequential polymerization catalyzed by a metallocene catalyst to produce a propylene homopolymer or propylene-ethylene random copolymer component having a low ethylene content in a first step and a propylene-ethylene random copolymer component having a higher ethylene content than that in the first step in a second step, the component composition and the ethylene component of each copolymer are specified, and the melt flow rate and the tan δ curve as obtained by dynamic mechanical analysis of the propylene-ethylene block copolymer are specified, and such a copolymer is employed as a material of a polypropylene based heat shrinkable film.

Specifically, in a block copolymer obtained by sequential polymerization which is composed of 30 to 95 wt % of a propylene homopolymer or propylene-ethylene random copolymer component (A1) having an ethylene content of at most 7 wt % in a first step and from 70 to 5 wt % of a propylene-ethylene random copolymer component (A2) having an ethylene content higher by from 3 to 20 wt % than that of the component (A1) in a second step, the melt flow rate (MFR) is within a range of 0.1 to 30 g/10 min, and a temperature-loss tangent (tan δ) curve obtainable by dynamic mechanical analysis (DMA) has a single peak at a temperature of at most 0° C., so as to improve transparency of the film.

Such definition of values is demonstrated by experiments and is confirmed by comparisons between Examples of the present invention and Comparative Examples as described hereinafter.

Further, the polypropylene based heat shrinkable film of the present invention is used also in the form of a multi-layer film. Further, incidentally, the molecular weight obtainable by gel permeation chromatography (GPC) measurement, the elution characteristics in a TREF elution curve obtainable as a plot of an elution amount (dwt %/dT) to a temperature in temperature rising elution fractionation (TREF), etc. are also defined.

In the above, the background, the constitution and the characteristics of the present invention are generally described. The whole constitution of the present invention will be given below as an overview. The present invention includes the following embodiments. The invention illustrated in the embodiment [1] is the basic invention, and the embodiment [2] and succeeding embodiments include additional features and depend on the basic invention.

[1] A polypropylene based heat shrinkable film obtained by using a propylene-ethylene block copolymer (A) which satisfies the following requirements (A-i) to (A-iv), and having heat shrinkability imparted by orientation in at least one direction:

(A-i) it is a propylene-ethylene block copolymer obtained through sequential polymerization catalyzed by a metallocene catalyst which is composed of 30 to 95 wt % of a propylene homopolymer or propylene-ethylene random copolymer component (A1) having an ethylene content of at most 7 wt % produced in a first step and 70 to 5 wt % of a propylene-ethylene random copolymer component (A2) produced in a second step having an ethylene content higher by 3 to 20 wt % than that of the component (A1);

(A-ii) it has a melt flow rate (MFR: 2.16 kg, 230° C.) within a range of 0.1 to 30 g/10 min;

(A-iii) a temperature-loss tangent (tan δ) curve obtained by dynamic mechanical analysis (DMA) tan δ has a single peak at a temperature of at most 0° C.;

(A-iv) in a temperature rising elution fractionation (TREF) curve obtained as a plot of an elution amount (dwt %/dT) to a temperature by means of temperature rising elution fractionation (TREF) using an o-dichlorobenzene solvent in a temperature range of −15° C. to 140° C., a peak temperature T(A1) observed at a high temperature side is within a range of 60° C. to 88° C., a peak temperature T(A2) observed at a low temperature side is at most 40° C. or a is peak temperature T(A2) is not observed, and a temperature T(A4) at which 99 wt % of the total amount of the propylene-ethylene block copolymer is eluted is less than 90° C.

[2] The polypropylene based heat shrinkable film according to [1], wherein the propylene-ethylene block copolymer (A) satisfies the following requirement (A-v):

(A-v) the amount W(Mw≦5,000) of a component having a molecular weight of at most 5,000, as obtained by gel permeation chromatography (GPC), is at most 0.6 wt % to the total amount of the component (A).

[3] The polypropylene based heat shrinkable film according to [1], wherein the propylene-ethylene block copolymer (A) satisfies the following requirement (A-vi):

(A-vi) the component (A1) obtained in the first step is a propylene-ethylene random copolymer having an ethylene content of 0.5 to 6 wt % and its proportion is 30 to 85 wt % to the total copolymer, and the component (A2) obtained in the second step is a propylene-ethylene random copolymer having an ethylene content higher by 6 to 18 wt % than that of the component (A1) and its proportion is 70 to 15 wt % to the total copolymer.

[4] The polypropylene based heat shrinkable film according to [1], wherein the propylene-ethylene block copolymer (A) satisfies the following requirement (A-vii):

(A-vii) the component (A1) obtained in the first step is a propylene-ethylene random copolymer having an ethylene content of 1.5 to 6 wt % and its proportion is 30 to 70 wt % to the total copolymer, and the component (A2) obtained in the second step is a propylene-ethylene random copolymer having an ethylene content higher by 8 to 16 wt % than that of the component (A1) and its proportion is 70 to 30 wt % to the total copolymer.

[5] The polypropylene based heat shrinkable film according to [1], which is oriented at a temperature lower by at least 20° C. than the melting temperature as measured by DSC of the propylene-ethylene block copolymer (A).

[6] The polypropylene based heat shrinkable film according to [1], which is oriented at least uniaxially by a Tenter method.

[7] The polypropylene based heat shrinkable film according to [1], which is biaxially oriented by blown film extrusion.

[8] A polypropylene based multi-layer heat shrinkable film obtained by using a propylene-ethylene block copolymer (A) which satisfies the following requirements (A-i) to (A-iv), and having heat shrinkability imparted by orientation in at least one direction:

(A-i) it is a propylene-ethylene block copolymer obtained through sequential polymerization catalyzed by a metallocene catalyst which is composed of 30 to 95 wt % of a propylene homopolymer or propylene-ethylene random copolymer component (A1) having an ethylene content of at most 7 wt % produced in a first step and 70 to 5 wt % of a propylene-ethylene random copolymer component (A2) produced in a second step having an ethylene content higher by 3 to 20 wt % than that of the component (A1);

(A-ii) it has a melt flow rate (MFR: 2.16 kg, 230° C.) within a range of 0.1 to 30 g/10 min;

(A-iii) a temperature-loss tangent (tan δ) curve obtained by dynamic mechanical analysis (DMA) tan δ has a single peak at a temperature of at most 0° C.;

(A-iv) in a temperature rising elution fractionation (TREF) curve obtained as a plot of an elution amount (dwt %/dT) to a temperature by means of temperature rising elution fractionation (TREF) using an o-dichlorobenzene solvent in a temperature range of −15° C. to 140° C., a peak temperature T(A1) observed at a high temperature side is within a range of 60° C. to 88° C., a peak temperature T(A2) observed at a low temperature side is at most 40° C. or a peak temperature T(A2) is not observed, and a temperature T(A4) at which 99 wt % of the total amount of the propylene-ethylene block copolymer is eluted is less than 90° C.

[9] The polypropylene based multi-layer heat shrinkable film according to [8], wherein the propylene-ethylene block copolymer (A) satisfies the following requirement (A-v):

(A-v) the amount W(Mw≦5,000) of a component having a molecular weight of at most 5,000, as obtained by gel permeation chromatography (GPC), is at most 0.6 wt % to the total amount of the component (A).

[10] The polypropylene based multi-layer heat shrinkable film according to [8], wherein the propylene-ethylene block copolymer (A) satisfies the following requirement (A-vi):

(A-vi) the component (A1) obtained in the first step is a propylene-ethylene random copolymer having an ethylene content of 0.5 to 6 wt % and its proportion is 30 to 85 wt % to the total copolymer, and the component (A2) obtained in the second step is a propylene-ethylene random copolymer having an ethylene content higher by 6 to 18 wt % than that of the component (A1) and its proportion is 70 to 15 wt % to the total copolymer.

[11] The polypropylene based multi-layer heat shrinkable film according to [8], wherein the propylene-ethylene block copolymer (A) satisfies the following requirement (A-vii):

(A-vii) the component (A1) obtained in the first step is a propylene-ethylene random copolymer having an ethylene content of 1.5 to 6 wt % and its proportion is 30 to 70 wt % to the total copolymer, and the component (A2) obtained in the second step is a propylene-ethylene random copolymer having an ethylene content higher by 8 to 16 wt % than that of the component (A1) and its proportion is 70 to 30 wt % to the total copolymer.

[12] The polypropylene based multi-layer heat shrinkable film according to [8], which is oriented at a temperature lower by at least 20° C. than the fusion peak temperature as measured by DSC of the propylene-ethylene block copolymer (A).

[13] The polypropylene based multi-layer heat shrinkable film according to [8], which is oriented at least uniaxially by a Tenter method.

[14] The polypropylene based multi-layer heat shrinkable film according to [8], which is biaxially oriented by blown film extrusion.

The polypropylene based heat shrinkable film of the present invention is excellent in outer appearance of a film, such as transparency and gloss, having high heat resistance, having reduced stickiness, bleeding and blocking and being thereby excellent in handling, having a high heat shrinkage factor, and in addition, having high impact resistance and being flexible after shrinkage and thereby being safe even if it has a thick corner.

In the accompanying drawings:

FIG. 1 is graphs illustrating a differential fractionation curve and a cumulative fractionation curve of PP-1.

FIG. 2 is a graph illustrating DMA result of PP-1.

FIG. 3 is a graph illustrating DMA result of PP-3.

Now, the present invention will be described in detail with reference to the preferred embodiments.

1. Constitution of Propylene-Ethylene Block Copolymer (1) Definition

In the present invention, a propylene-ethylene block copolymer (A) to be used as a material of the polypropylene based heat shrinkable film is obtained by sequential polymerization catalyzed by a metallocene catalyst to produce 30 to 95 wt % of a propylene homopolymer or propylene-ethylene random copolymer component (A1) having an ethylene content of at most 7 wt % in a first step and 70 to 5 wt % of a propylene-ethylene random copolymer component (A2) having an ethylene content higher by 3 to 20 wt % than that of the component (A1) in a second step.

The above propylene-ethylene block copolymer (A) is commonly called a block copolymer, but in the copolymer, the component (A1) and the component (A2) are blended but not bonded by polymerization.

(2) Component (A1)

(2-1) Ethylene Content E(A1) in Component (A1)

The component (A1) to be produced in a first step must be a propylene homopolymer or a propylene-ethylene random copolymer having an ethylene content of at most 7 wt %, having a relatively high melting point and having crystallinity, so as to suppress stickiness and to develop heat resistance. If the ethylene content exceeds 7 wt %, the melting point tends to be too low, thus impairing heat resistance, and accordingly, the ethylene content is at most 7 wt %, preferably at most 6 wt %. Even when the component (A1) is a propylene homopolymer, improved flexibility, transparency and heat resistance will be obtained, but if the component (A1) is a propylene homopolymer, it will be necessary to extremely increase the proportion of the component (A2) as described hereinafter so as to obtain sufficient flexibility with transparency maintained, and such will lead to remarkable deterioration in heat resistance or remarkable increase in stickiness and blocking.

On the other hand, when the component (A1) is a propylene-ethylene random copolymer, the heat resistance seems to deteriorate as the melting point of the component (A1) itself is low. However, the amount of the component (A2) required to obtain sufficient flexibility can be suppressed, whereby heat resistance as the whole block copolymer rather improves, and the increase in stickiness and blocking is small.

Further, due to the lowered melting point, sufficient molding stability will be achieved even when the molding temperature at the time of orientation is lowered, whereby a heat shrinkable film very excellent in heat shrinkage performance and the like can be obtained.

From the above viewpoint, the ethylene content in the component (A1) is preferably at least 0.5 wt %, more preferably at least 1.5 wt %.

(2-2) Proportion of Component (A1) in Propylene-Ethylene Block Copolymer (A)

If the proportion of the component (A1) in the propylene-ethylene block copolymer (A) is too large, no sufficient effects of improving flexibility, impact resistance and transparency of the propylene-ethylene block copolymer will be achieved. Thus, the proportion of the component (A1) is at most 95 wt %, preferably at most 85 wt %, more preferably at most 70 wt %.

On the other hand, if the proportion of the component (A1) is too small, stickiness tends to increase, and heat resistance will remarkably deteriorate, and thus the proportion of the component (A1) is at least 30 wt %, preferably at least 40 wt %.

(3) Component (A2)

(3-1) Ethylene Content E(A2) in Component (A2)

The propylene-ethylene random copolymer component (A2) to be produced in a second step is a component necessary to improve flexibility, impact resistance and transparency of the propylene-ethylene block propolymer (A).

The component (A2) is required to have an ethylene content within a specific range so as to sufficiently achieve the above effects. Namely, with respect to the propylene-ethylene random copolymer (A) to be used in the present invention, the effect of improving flexibility is higher when the crystallinity of the component (A2) is lower than the component (A1), and the crystallinity is controlled by the ethylene content in the propylene-ethylene random copolymer (A). Thus, the effect of the component (A2) will not be achieved unless the ethylene content E(A2) in the component (A2) is higher by at least 3 wt % than the ethylene content E(A1) in the component (A1), and the component (A2) contains ethylene in an amount larger by preferably at least 6 wt %, more preferably at least 8 wt % than the component (A1).

When the difference in ethylene content between the component (A1) and the component (A2) is defined as E(gap) (=E(A2)–E(A1)), E(gap) is at least 3 wt %, preferably at least 6 wt %, more preferably at least 8 wt %.

On the other hand, if the ethylene content is increased too much so as to lower the crystallinity of the component (A2), the difference E(gap) in the ethylene content between the component (A1) and the component (A2) will be too large, whereby the copolymer will take a phase-separated structure into the matrix and the domain, and the transparency of the film tends to decrease. This is because a polypropylene inherently has low miscibility with a polyethylene, and in the propylene-ethylene random copolymer (A) also, miscibility of ones having different ethylene contents tends to decrease when the difference in the ethylene content becomes significant. With respect to the upper limit of E(gap), it should be within a range where the tan δ curve has a single peak tan δ as obtained by dynamic mechanical analysis described hereinafter, and in order to achieve the above, E(gap) is at most 20 wt %, preferably at most 18 wt %, more preferably at most 16 wt %.

(3-1) Proportion of Component (A2) in Propylene-Ethylene Random Copolymer (A)

If the proportion of the component (A2) is too large, stickiness tends to increase and the blocking tends to be significant, and a decrease in heat resistance tends to be remarkable. Thus, the proportion of the component (A2) is required to be at most 70 wt %.

On the other hand, if the proportion of the component (A2) is too small, no effect of improving flexibility and impact resistance will be obtained. Thus, the proportion of (A2) is required to be at least 5 wt %, preferably at least 15 wt %, more preferably at least 30 wt %.

(4) Melt Flow Rate (MFR) of Propylene-Ethylene Random Copolymer (A)

MFR of the propylene-ethylene random copolymer (A) to be used for the polypropylene based film of the present invention is required to be within a range of 0.1 to 30 g/10 min. In the present invention, if MFR is too low, surface roughness called sharkskin or melt fracture occurs on the surface of the film, whereby not only transparency and the outer appearance will be remarkably impaired, but also orientation will be difficult. On the other hand, if the MFR is too high, the shrinkage factor and the impact resistance tend to lower.

Thus, in the present invention, MFR of the propylene-ethylene random copolymer (A) of the present invention has to be within a range of 0.1 to 30 g/10 min, and it is preferably 0.5 to 10 g/10 min in view of the balance of the molding stability, the outer appearance of the film and the physical properties.

The melt flow rate (MFR) in the present invention is measured in accordance with JIS K7210, method A, condition M under such conditions that test temperature: 230° C., nominal load: 2.16 kg, die shape: diameter 2.095 mm and length 8.00 mm.

(5) Specification by Dynamic Mechanical Analysis (5-1) Definition by Peak in Tan δ Curve It is necessary for the propylene-ethylene random copolymer (A) to be used for the polypropylene based film of the present invention that a temperature-loss tangent (tan δ) curve obtained by dynamic mechanical analysis (DMA) tan δ has a single peak at a temperature of at most 0° C.

When the propylene-ethylene block copolymer (A) takes a phase-separated structure, a glass transition temperature of an amorphous part contained in the component (A1) and a glass transition temperature of an amorphous part contained in the component (A2) are different, so multiple peaks are observed. In such a case, transparency will remarkably deteriorate.

Whether the propylene-ethylene block copolymer (A) takes a phase-separated structure or not, is distinguishable by the tan δ curve in dynamic mechanical analysis. In order that the copolymer will not take a phase-separated structure which affects transparency of a molded product, the tan δ curve must have a single peak at a temperature of at most 0° C.

In the present invention, in order to achieve transparency, it is essential for the tan δ curve in dynamic mechanical analysis to have a single peak.

FIG. 2 illustrates an example (Polymer Production Example 1) of a tan δ curve of the present invention and FIG. 3 illustrates an example (Polymer Production Example 3) of a tan δ curve having no single peak for comparison.

(5-2) Measurement Method

Dynamic mechanical analysis is carried out, specifically, by imposing a sinusoidal strain of a specific frequency to a strip-like test piece and by detecting the stress thus caused. The measurement is carried out by using a frequency of 1 Hz and by raising a measurement temperature step-wise from −60° C. until a sample is melted so that the measurement becomes impossible. The amplitude of the strain is recommended to be about from 0.1 to 0.5%. Storage modulus and loss modulus are determined from the stress thus obtained in accordance with well-known method, and loss tangent (=loss modulus G"/storage modulus G') defined by their ratio is plotted to a temperature to obtain a tan δ curve, which has a sharp peak within a temperature range of at most 0° C. in the present invention. Generally, the peak of the tan δ curve at 0° C. or lower indicates glass transition of an amorphous phase, and the present peak temperature is defined as a glass transition temperature Tg (° C.).

(6) Specification of Ethylene Contents E(A1) and E(A2) and Amounts of W(A1) and W(A2) of Components (A1) and (A2)

Respective ethylene contents and amounts of the component (A1) and the component (A2) can be specified by a material balance of polymerization, but in order to specify them more accurately, it is preferable to employ the following analysis (fractionation).

(6-1) Specification of Respective Amounts W(A1) and W(A2) by Temperature Rising Elution Fractionation (TREF)

6-1-1 Temperature Rising Elution Fractionation

Temperature rising elution fractionation (TREF) is well known for the evaluation method for crystallinity distribution of the propylene-ethylene block copolymer (A) to those skilled in the art, measuring methods of which are fully described in the following Documents.

G. Glockner, *J. Appl. Polym. Sci.: Appl. Polym. Symp.* 45, 1-24 (1990)

L. Wild, *Adv. Polym. Sci.* 98, 1-47 (1990)

J. B. P. Soares, A. E. Hamielec, *Polymer* 36, 8, 1639-1654 (1995)

Respective crystallinities of the component (A1) and the component (A2) of the propylene-ethylene block copolymer (A) of the present invention are largely different. And since it is produced by using a metallocene catalyst, respective crystallinity distributions become narrow and an amount of a component intermediate between the two components is quite small. Consequently it is possible to accurately separate the components by TREF.

In TREF elution curve obtainable as a plot of an elution amount (dwt %/dT) to a temperature by temperature rising elution fractionation (TREF) within a temperature range of −15° C. to 140° C. employing o-dichlorobenzene as a solvent, elution peaks appear at T(A1) and T(A2) respectively due to the difference in crystallinities of the component (A1) and the component (A2). And since this difference is sufficiently large, it is possible to separate the components almost at an intermediate temperature T(A3)(={T(A1)+T(A2)}/2).

Further, the lower limit of the TREF measurement temperature of the apparatus used for this measurement is −15° C. However, if the crystallinity of the component (A2) is very low or the component (A2) is amorphous, the peak does not appear in the measurement temperature range (in this case, a concentration of the component (A2) dissolved in a solvent is detected at the lower limit of measurement temperature (i.e. −15° C.)). In such a case, it is considered that T(A2) is present at a temperature lower than the lower limit of the measurement temperature, but since this value cannot be measured, T(A2) is defined to be −15° C., which is the lower limit of the measurement temperature.

When an accumulated amount of a part eluted up to T(A3) is defined as W(A2) wt % and an accumulated amount of a part eluted above T(A3) is defined as W(A1) wt %, W(A2) almost corresponds to an amount of the low crystalline or amorphous component (A2), and an accumulated amount W(A1) of a part eluted above T(A3) almost corresponds to an amount of the component (A1) having a relatively high crystallinity. A TREF elution curve is illustrated by FIG. 1 by Polymer Production Example A-1.

6-1-2 TREF Measurement

In the present invention, TREF measurement is specifically carried out in the following manner. A sample is dissolved in o-dichlorobenzene (including 0.5 mg/ml of BHT) at 140° C. to prepare a solution. The solution is introduced into a TREF column at 140° C. and is then cooled to 100° C. at a cooling rate of 8° C./min, and is further cooled to −15° C. at a cooling rate of 4° C./min and is maintained for 60 min. Thereafter, o-dichlorobenzene (including 0.5 mg/ml of BHT) as a solvent is flowed through the column at −15° C. at a flow rate of 1 ml/min, so that a component dissolved in o-dichlorobenzene at −15° C. in the TREF column is eluted for 10 min, and the column is then heated linearly at a heating rate of 100° C./hour to 140° C. to obtain an elution curve.

(6-2) Specification of Ethylene Contents E(A1) and E(A2) of Respective Components 6-2-1 Separation of Component (A1) and Component (A2)

On the basis of T(A3) determined by the previous TREF measurement, the component (A2) soluble at T(A3) and the component (A1) insoluble at T(A3) are fractionated by a temperature rising column fractionation method employing a preparative fractionation apparatus, and respective ethylene contents are measured by NMR.

The temperature rising column fractionation method is disclosed, for example, in *Macromolecules* 21, 314-319, (1988). Concretely, the following method was used in the present invention.

6-2-2 Fractionation Condition

Glass beads carrier (from 80 to 100 mesh) is filled in a cylindrical column having a diameter of 50 mm and a height of 500 mm and is maintained at 140° C. Thereafter, 200 ml of sample solution (10 mg/ml, solvent: o-dichlorobenzene) prepared at 140° C. is introduced into said column. The column is then cooled at a cooling rate of 10° C./hour to 0° C. After the column is maintained at 0° C. for 1 hour, the column temperature is raised to T(A3) at a temperature-raising rate of 10° C./hour and is maintained for 1 hour. The temperature control accuracy of the column through the sequential operation is ±1° C.

Thereafter, while the column temperature is maintained at T(A3), 800 ml of o-dichlorobenzene at T(A3) is flowed at a flow rate of 20 ml/min, so that a component soluble at T(A3) present in the column is eluted and recovered.

Thereafter, the column temperature is raised to 140° C. at a temperature-raising rate of 10° C./hour, and the column is allowed to maintain at 140° C. for 1 hour, and by flowing 800 ml of o-dichlorobenzene as a solvent at 140° C. at a flow rate of 20 ml/min, a component insoluble at T(A3) is eluted and recovered.

The solution containing a polymer obtained by fractionation is concentrated to 20 ml by evaporation, and the polymer is precipitated in 5 times its amount of methanol. The precipitated polymer is recovered by filtration, and is dried for one night in a vacuum drier.

6-2-3 Measurement of Ethylene Content by $^{13}$C-NMR

After respective components (A) and (B) are obtained by the above fractionation method, their ethylene contents are determined by analyzing $^{13}$C-NMR spectra measured under the following conditions with proton noise decoupling.

Instrument: GSX-400 manufactured by JEOL Ltd. or its equivalent one
(Carbon nucleus resonance frequency: at least 100 MHz)
Solvent: o-dichlorobenzene/deuterated benzene=4/1 (volume ratio)
Concentration: 100 mg/ml
Temperature: 130° C.
Pulse angle: 90°

Pulse repetition time: 15 seconds
Number of accumulations: at least 5,000

Assignment of peaks can be carried out referring to e.g. *Macromolecules* 17, 1950 (1984). Assignment of each peak measured under the above conditions is listed in Table 1. $S\alpha\alpha$ and the like in the Table 1 are expressed in accordance with Carman's method (*Macromolecules* 10, 536 (1977)), and P represents methyl carbon, S represents methylene carbon and T represents methine carbon.

TABLE 1

| Chemical Shift (ppm) | Assignment |
| --- | --- |
| 45 to 48 | $S\alpha\alpha$ |
| 37.8 to 37.9 | $S\alpha\gamma$ |
| 37.4 to 37.5 | $S\alpha\delta$ |
| 33.1 | $T\delta\delta$ |
| 30.9 | $T\beta\delta$ |
| 30.6 | $S\gamma\gamma$ |
| 30.2 | $S\gamma\delta$ |
| 29.8 | $S\delta\delta$ |
| 28.7 | $T\beta\beta$ |
| 27.4 to 27.6 | $S\beta\delta$ |
| 24.4 to 24.7 | $S\beta\beta$ |
| 19.1 to 22.0 | P |

When "P" represents a propylene unit and "E" represents an ethylene unit in the chain of a copolymer, six kinds of triads, PPP, PPE, EPE, PEP, PEE and EEE are present in the chain. Described in *Macromolecules* 15, 1150 (1982), relationships between the triad concentration and the peak intensity are linked with the following equations (1) to (6):

$$[PPP] = k \times I(T\beta\beta) \quad (1)$$

$$[PPE] = k \times I(T\beta\delta) \quad (2)$$

$$[EPE] = k \times I(T\delta\delta) \quad (3)$$

$$[PEP] = k \times I(S\beta\beta) \quad (4)$$

$$[PEE] = k \times I(S\beta\delta) \quad (5)$$

$$[EEE] = k \times \{I(S\delta\delta)/2 + I(S\gamma\delta)/4\} \quad (6)$$

Where, [ ] represents a fraction of triad, e.g. [PPP] is PPP fraction in all the triads. Therefore, $$[PPP]+[PPE]+[EPE]+[PEP]+[PEE]+[EEE]=1 \quad (7)$$

k is a constant and I is a peak intensity. $I(T_{\beta\beta})$, for example, represents a peak intensity at 28.7 ppm attributed to $T_{\beta\beta}$.

By using the above equations (1) to (7), a fraction of each triad is determined. An ethylene content is then determined by the following equation.

$$\text{Ethylene content (mol \%)} = ([PEP]+[PEE]+[EEE]) \times 100$$

The propylene-ethylene block copolymer (A) to be used in the present invention may include weak irregular peaks derived from a small amount of a heterogeneous bond (2,1-insertion and/or 1,3-insertion) as listed in Table 2.

TABLE 2

| Chemical Shift (ppm) | Assignment |
| --- | --- |
| 42.0 | $S\alpha\alpha$ |
| 38.2 | $T\alpha\gamma$ |
| 37.1 | $S\alpha\delta$ |
| 34.1 to 35.6 | $S\alpha\beta$ |
| 33.7 | $T\gamma\gamma$ |
| 33.3 | $T\gamma\delta$ |
| 30.8 to 31.2 | $T\beta\gamma$ |
| 30.5 | $T\beta\delta$ |
| 30.3 | $S\alpha\beta$ |
| 27.3 | $S\beta\gamma$ |

In order to determine an accurate ethylene content, it is necessary to make calculation by taking those peaks derived from a heterogeneous bond into account. However, it is difficult to completely resolve these peaks derived from a heterogeneous bond and identify them. In addition, because the amount of the heterogeneous bond is very small, the ethylene content of the present invention is determined simply from equations (1) to (7) in the same manner as in analysis of a copolymer made with a Ziegler-Natta catalyst which contains substantially no heterogeneous bond.

A conversion of ethylene content mol % to wt % is carried out in accordance with the following formula.

$$\text{Ethylene content (wt \%)} = (28 \times X/100)/\{28 \times X/100 + 42 \times (1 - X/100)\} \times 100$$

In the above formula, X is an ethylene content expressed by mol %.

Also, an ethylene content E(W) of the whole ethylene-propylene block copolymer (A) is calculated from the above measured respective ethylene contents E(A1) and E(A2) of the components (A1) and (A2) and weight ratios W(A1) and W(A2) of the respective components calculated by TREF in accordance with the following formula.

$$E(W) = \{E(A1) \times W(A1) + E(A2) \times W(A2)\}/100 \text{ (wt \%)}$$

(6-3) Additional Requirement of Crystallinity Distribution by TREF Elution Curve By TREF elution curve used to specify the amounts of the respective components, additional characters can be imparted in crystallinity distribution of the ethylene-propylene block copolymer (A) to be used in the present invention.

6-3-1 Elution Peak Temperature T(A1)

As elution peak temperature T(A1) of the component (A1) in the TREF elution curve is higher, the crystallinity of the component (A1) becomes higher. If the crystallinity of the component (A1) is high, the component (A2) required to improved impact resistance and flexibility after shrinkage of the propylene-ethylene block copolymer (A) must be large.

On the other hand, if the proportion of the component (A2) is too large, stickiness and blocking tend to be significant and heat resistance tends to decrease. Therefore, T(A1) is preferably not too high so as to improve the balance of the impact resistance, flexibility after shrinkage and transparency. Further, the heat shrinkage factor tends to deteriorate along with the increase in the orientation temperature, and by lowering T(A1), stable molding becomes possible even when the orientation temperature is lowered.

In the present invention, the component (A1) is a propylene homopolymer or a random copolymer having an ethylene content of at most 7 wt %, and T(A1) can be lowered by increasing the ethylene content. In order to achieve sufficient flexibility, transparency and heat resistance in a well balanced manner, T(A1) is required to be at most 88° C., preferably at most 85° C.

On the other hand, if the peak temperature T(A1) is less than 60° C., the temperature at which crystals of the component (A1) are melted tends to be low, the block copolymer cannot have sufficient heat resistance, and the blocking tends to be significant. Thus, in the present invention, the peak temperature T(A1) is required to be at least 60° C., preferably at least 65° C.

6-3-2 Elution Completion Temperature T(A4)

When crystallinity distribution is broad on the high crystallinity side even thought T(A1) is low, transparency becomes poor, and it will be difficult to decrease the orientation temperature as described hereinafter. This is estimated to be because uniform orientation will be difficult due to the crystallinity distribution on the high crystallinity side.

Therefore, it is preferred to suppress the extension of the crystallinity to the high temperature side in the TREF elution curve. The extension of the crystallinity to the high crystallinity side can be evaluated by TREF measurement. Elution completion temperature T(A4) of the whole propylene-ethylene block copolymer (A) (elution completion temperature T(A4) is defined as a temperature at which 99 wt % of the wholes eluted, since it is difficult to define the temperature at which the whole is eluted considering an error in TREF measurement) to the peak temperature T(A1) is preferably not high. If there is a component eluted at a high temperature side, the crystallinity of the component will increase. Thus, T(A4) is required to be less than 90° C., preferably at most 89° C., as a preferred embodiment of the present invention.

Further, the temperature difference $\Delta T(T(A4)-T(A1))$ from an elution peak to the end is preferably at most 5° C., more preferably at most 4° C., furthermore preferably at most 3° C.

6-3-3 Elution Peak Temperature T(A2)

If the crystallinity of the component (A2) is not sufficiently lowered, it is impossible to obtain flexibility and transparency of the propylene-ethylene block copolymer component (A), and therefore T(A2) is required to be at most 40° C., preferably at most 39° C.

(7) Molecular Weight (7-1) Definition of Molecular Weight

The propylene-ethylene block copolymer component (A) of the present invention is additionally characterized in that an amount of a low molecular weight component is small.

A low molecular weight component, particularly a component having a molecular weight so small as not to entangle with each, tends to bleed out on the surface of a molded product, which causes stickiness and bad transparency.

A critical molecular weight, which should be molecular weight between entanglement for polypropylene, is about 5,000 as disclosed in Journal of Polymer Science: Part B: Polymer Physics; 37 1023-1033 (1999).

Accordingly, the block copolymer of the present invention contains little amount of a low molecular weight component, and the amount of a component having a weight average molecular weight of at most 5,000 is at most 0.6 wt %, preferably at most 0.4 wt %.

(7-2) Measurement of Molecular Weight

In the present invention, a weight average molecular weight (Mw) and a number average molecular weight (Mn) are measured by gel permeation chromatography (GPC).

Calculation of a molecular weight from a retention volume is carried out by a calibration curve previously prepared by standard polystyrene.

The standard polystyrene used is the following products manufactured by Tosoh Corporation.

F380, F288, F128, F80, F40, F20, F10, F4, F1, A5000, A2500, A1000

The calibration curve is prepared by injecting 0.2 ml of a solution having each standard polystyrene dissolved in o-dichlorobenzene (including 0.5 mg/ml of BHT) at a concentration of 0.5 mg/ml.

The calibration curve employs third-order formula obtained by approximating by method of least squares. A viscosity formula $[\eta]=K \times M^\alpha$ used for calculating a molecular weight employs the following numerical values.

PS: $K=1.38\times10^{-4}$ $\alpha=0.7$
PE: $K=3.92\times10^{-4}$ $\alpha=0.733$
PP: $K=1.03\times10^{-4}$ $\alpha=0.78$ The measurement conditions of GPC are as follows.

Apparatus: GPC (ALC/GPC 150 C) manufactured by WATERS Company

Detector: MIRAN 1A IR detector (wavelength: 3.42 μm) manufactured by FOXBORO Company Column: AD806 M/S (three columns) manufactured by Showa Denko K.K.

Mobile phase solvent: o-dichlorobenzene

Measurement temperature: 140° C.

Flow rate: 1.0 ml/min.

Sample solution amount: 0.2 ml

Preparation of sample: a sample is dissolved at 140° C. over about 1 hour in o-dichlorobenzene (including 0.5 mg/ml of BHT) to prepare a 1 mg/ml solution. By plotting an elution amount to a molecular weight obtained by GPC measurement, the amount of components having a molecular weight of at most 5,000 can be determined.

2. Preparation of Propylene-Ethylene Block Copolymer (A)

(1) Metallocene Catalyst

It is essential for the preparation of the propylene-ethylene block copolymer (A) to be used in the present invention to employ a metallocene catalyst.

It is well known to those skilled in the art that the propylene-ethylene block copolymer (A) with broad molecular weight or crystallinity distribution will have significant stickiness and bleeding. Therefore, in order to suppress stickiness and bleeding, and further in order to achieve sufficient transparency and heat shrinkability of a heat shrinkable film, it is also essential for the preparation for the propylene-ethylene block copolymer to be used in the present invention to employ a metallocene catalyst which give polymers with narrow molecular weight and crystallinity distributions. It is proved by the following Examples and comparative Examples that an excellent propylene-ethylene block copolymer of the present invention cannot be obtained by a Zeigler-Natta catalyst.

A kind of a metallocene catalyst is not limited so long as a copolymer having the aimed performances of the present invention can be obtained, but in order to satisfy the requirements of the present invention, it is preferable to use a metallocene catalyst comprising, for example, the following component (a) and component (b), and an optional component (c).

Component (a): At least one kind of metallocene transition metal compound selected from transition metal compounds expressed by the general formula (1).

Component (b): At least one solid component selected from the following (b-1) to (b-4):

(b-1) Fine Particle Support Having an Organic Aluminum Oxy Compound Carried (b-2) Fine Particle Support Having Lewis Acid or Ionic Compound Capable of Reacting with and Converting Component (a) into Cation Carried (b-3) Fine Particles of Solid Acid (b-4) Ion Exchangeable Layer-Like Silicate Component (c): Organic Aluminum Compound (1-1) Component (a)

As the component (a), at least one kind of metallocene transition metal compound selected from transition metal compounds expressed by the following general formula (1) can be used.

$$Q(C_5H_4\text{-}aR_1)(C_5H_4\text{-}bR_2)MeXY \qquad (1)$$

(In the above formula, Q is a divalent bonding group crosslinking two conjugated five-membered ring ligands, Me is a metal atom selected from titanium, zirconium and hafnium, X and Y are a hydrogen atom, a halogen atom, a hydrocarbon group, an alkoxy group, an amino group, a nitrogen-containing hydrocarbon group, a phosphorus-containing hydrocarbon group or a silicon-containing hydrocarbon group, X and Y may be independent, that is, the same or different, $R_1$ and $R_2$ are hydrogen, a hydrocarbon group, a halogenated hydrocarbon group, a silicon-containing hydrocarbon group, a nitrogen-containing hydrocarbon group, an oxygen-containing hydrocarbon group, a boron-containing hydrocarbon group or a phosphorus-containing hydrocarbon group, and a and b are numbers of substituents.)

Particularly, Q is a divalent bonding group crosslinking two conjugated five-membered ring ligands such as a divalent hydrocarbon group, a silylene group or an oligosilylene group, a silylene group having a hydrocarbon group as a substituent or an oligosilylene group having a hydrocarbon group as a substituent, or a germylene group having a hydrocarbon group as a substituent. Among them, preferable examples include a divalent hydrocarbon group and a silylene group having a hydrocarbon group as a substituent.

X and Y are a hydrogen atom, a halogen atom, a hydrocarbon group, an alkoxy group, an amino group, a nitrogen-containing hydrocarbon group, a phosphorus-containing hydrocarbon group or a silicon-containing hydrocarbon group, and among them, preferable examples include hydrogen, chlorine, methyl, isobutyl, phenyl, dimethylamide and diethylamide groups. X and Y may be independent, that is, the same or different.

$R_1$ and $R_2$ are hydrogen, a hydrocarbon group, a halogenated hydrocarbon group, a silicon-containing hydrocarbon group, a nitrogen-containing hydrocarbon group, an oxygen-containing hydrocarbon group, a boron-containing hydrocarbon group or a phosphorus-containing hydrocarbon group. Examples of the hydrocarbon group include a methyl group, an ethyl group, a propyl group, a butyl group, a hexyl group, an octyl group, a phenyl group, a naphthyl group, a butenyl group and a butadienyl group. Also, typical examples of a halogenated hydrocarbon group, a silicon-containing hydrocarbon group, a nitrogen-containing hydrocarbon group, an oxygen-containing hydrocarbon group, a boron-containing hydrocarbon group or a phosphorus-containing hydrocarbon group include a methoxy group, an ethoxy group, a phenoxy group, a trimethylsilyl group, a diethylamino group, a diphenylamino group, a pyrazolyl group, an indolyl group, a dimethylphosphino group, a diphenylphosphino group, a diphenyl boron group and a dimethoxy boron group. Among them, a hydrocarbon group having a carbon number of from 1 to 20 is preferable, and particularly preferable examples include a methyl group, an ethyl group, a propyl group and a butyl group. Adjacent $R_1$ and $R_2$ may bond to each other to form a ring, and the ring thus formed may have a hydrocarbon group, a halogenated hydrocarbon group, a silicon-containing hydrocarbon group, a nitrogen-containing hydrocarbon group, an oxygen-containing hydrocarbon group, a boron-containing hydrocarbon group or a phosphorus-containing hydrocarbon group as a substituent.

Me is a metal atom selected from titanium, zirconium and hafnium, and is preferably zirconium or hafnium.

Among the above illustrated components (a), preferable examples for producing the propylene based polymer of the present invention include a transition metal compound comprising a ligand having a substituted cyclopentadienyl group, a substituted indenyl group, a substituted fluorenyl group or a substituted azulenyl group, crosslinked with a silylene group, a germylene group or an alkylene group, having a hydrocarbon substituent, and particularly preferable examples include a transition metal compound comprising a ligand having a 2,4-substituted indenyl group or a 2,4-substituted azulenyl group, crosslinked with a silylene group or a germylene group, having a hydrocarbon substituent.

Non-limited examples include dimethylsilylenebis(2-methyl-4-phenylindenyl)zirconium dichloride, diphenylsilylenebis(2-methyl-4-phenylindenyl)zirconium dichloride, dimethylsilylenebis(2-methylbenzoindenyl)zirconium dichloride, dimethylsilylenebis{2-isopropyl-4-(3,5-diisopropylphenyl)indenyl}zirconium dichloride, dimethylsilylenebis(2-propyl-4-phenanthrylindenyl)zirconium dichloride, dimethylsilylenebis(2-methyl-4-phenylazulenyl)zirconium dichloride, dimethylsilylenebis{2-methyl-4-(4-chlorophenyl)azulenyl}zirconium dichloride, dimethylsilylenebis(2-ethyl-4-phenylazulenyl)zirconium dichloride, dimethylsilylenebis(2-isopropyl-4-phenylazulenyl)zirconium dichloride, dimethylsilylenebis{2-ethyl-4-(2-fluorobiphenyl)azulenyl}zirconium dichloride, dimethylsilylenebis{2-ethyl-4-(4-t-butyl-3-chlorophenyl)azulenyl}zirconium dichloride, and the like.

Further examples include these compounds having a silylene group replaced by a germylene group and/or having zirconium replaced by hafnium.

Since the detailed structure of the catalyst component is not an important factor of the present invention, redundant examples are not illustrated and typical examples only are illustrated, but the present invention should not be limited to the above illustrated range.

(1-2) Component (b)

As the component (b), at least one kind of solid component selected from above-mentioned component (b-1) to component (b-4) is used. These components are well known, and an optionally selected one among the well known techniques is usable. Their examples and preparations are fully disclosed in JP-A-2002-284808, JP-A-2002-53609, JP-A-2002-69116, JP-A-2003-105015 and the like.

Examples of a fine particle support used in the component (b-1) and the component (b-2) include an inorganic oxide such as silica, alumina, magnesia, silica alumina or silica magnesia, an inorganic halide such as magnesium chloride, magnesium oxychloride, aluminum chloride or lanthanum chloride, and a porous organic carrier such as polypropylene, polyethylene, polystyrene, styrenedivinylbenzene copolymer or acrylic acid based copolymers.

Also, as non-limited examples of the component (b), examples of the component (b-1) include fine particle-like carriers having methyl alumoxane, isobutyl alumoxane, methylisobutyl alumoxane, aluminum tetraisobutyl butyl-borate or the like carried, examples of the component (b-2) include fine particle-like carriers having triphenylborane, tris(3,5-difluorophenyl)borane, tris(pentafluorophenyl)borane, triphenylcarbonium tetrakis(pentafluorophenyl)borate, N,N-dimethylanilinium tetrakis(pentafluorophenyl)borate or the like carried, examples of the component (b-3) include alumina, silica alumina, magnesium chloride or the like, and examples of the component (b-4) include smectite group, vermiculite group or mica group, such as montmorillonite, zacounite, beidellite, nontronite, saponite, hectorite, stivensite, bentonite, taeniolite or the like. They may form a mixed layer.

Particularly preferable examples of the above component (b) include an ion exchangeable layer-like silicate of the component (b-4), and more preferable examples include an ion exchangeable layer-like silicate subjected to a chemical treatment such as an acid treatment, an alkali treatment, a salt treatment or an organic treatment.

(1-3) Component (c)

Examples of an optionally used component (c) include an organic aluminum compound expressed by the general formula, $$AlR_aX_{3-a}$$

(wherein R is a hydrocarbon group having a carbon number of from 1 to 20, X is hydrogen, a halogen or an alkoxy group, and a is a number of $0<a\leq 3$), including a trialkylaluminum such as trimethylaluminum, triethylaluminum, tripropylaluminum or triisobutylaluminum, and a halogen or alkoxy-containing alkylaluminum such as diethylaluminum monochloride or diethylaluminum monomethoxide. In addition to these materials, aluminoxanes such as methyl aluminoxane are usable. Among them, a trialkylaluminum is particularly preferable.

(1-4) Preparation of Catalyst

A catalyst is prepared by contacting the component (a) and the component (b) and optionally the component (c). The contacting procedure is not limited, but can be carried out in the following order. Also, this contacting procedure may be included not only in the independent operation of the catalyst preparation but also in prepolymerization of olefin or in polymerization of olefin.

1) The component (a) and the component (b) are contacted.

2) After contacting the component (a) and the component (b), the component (c) is added thereto.

3) After contacting the component (a) and the component (c), the component (b) is added thereto.

4) After contacting the component (b) and the component (c), the component (a) is added thereto.

5) Three components may be contacted at the same time.

(1-5) Amount of Components

Respective amounts of components (a), (b) and (c) used in the present invention are optional. For example, an amount of component (a) to component (b) is preferably from 0.1 to 1,000 mmol, more preferably from 0.5 to 500 mmol, to 1 g of component (b). An amount of component (c) to component (b) is preferably from 0.001 to 100 mmol in terms of a transition metal amount, more preferably from 0.005 to 50 μmol, to 1 g of component (b). Accordingly, an amount of component (c) to component (a) is preferably from $10^{-5}$ to 50 in terms of a transition metal mol ratio, more preferably from $10^{-4}$ to 5.

(1-6) Prepolymerization

The catalyst of the present invention is preferably subjected to prepolymerization in which the catalyst is contacted with an olefin monomer and somewhat grown up with a small amount of polymer before polymerization. The olefin monomer used is not limited, but its examples include ethylene, propylene, 1-butene, 1-hexene, 1-octene, 4-methyl-1-pentene, 3-methyl-1-butene, vinylcycloalkane, styrene and the like, and among them, propylene is particularly preferable. An olefin is supplied to the reaction vessel in an optional procedure, for example, at a constant rate, or at a constant pressure so as to hold a reaction pressure constant, their combination, or in a sequentially programmed method. Prepolymerization temperatures are not limited but preferably in the range of −20 to 100° C. The prepolymerization time is not limited but preferably in the range of 5 minutes to 24 hours. Relative amounts of prepolymerized polymer to the component (b) are preferably from 0.01 to 100, more preferably from 0.1 to 50. After the prepolymerization, the catalyst may be used as it is, depending on the catalyst feed system, or may be dried if necessary.

At the same time of contacting of the above components or after contacting, a polymer such as polyethylene, polypropylene or polystyrene and/or an inorganic oxide solid such as silica or titania may be present therein.

(2) Polymerization (2-1) Sequential Polymerization

In order to prepare the propylene-ethylene block copolymer (A) to be used in the present invention, it is necessary to carry out sequential polymerization to get a crystalline propylene-ethylene random copolymer component (A1) and a low crystalline or amorphous propylene-ethylene random copolymer component (A2), from the above described reasons.

When carrying out sequential polymerization, it is possible to employ any of a batch process and a continuous process, but it is generally preferable to employ a continuous process in view of productivity.

In the case of a batch polymerization process, it is possible to prepare a component (A1) and a component (A2) individually in a single reactor by changing the polymerization conditions sequentially. As long as the present invention is efficient, it is possible to multiply the reactors in parallel.

In the case of a continuous polymerization process, it is necessary to employ at least two reactors connected in series in order to prepare a component (A1) and a component (A2) individually. As long as the present invention is effective, it is possible to multiply the reactors in series and/or in parallel for a component (A1) and a component (A2) respectively.

(2-2) Polymerization Process

As the polymerization process, it is possible to employ an optional polymerization process such as a slurry process, a bulk process, a gas phase process or the like. It is possible to employ a supercritical condition as an intermediate condition between the bulk phase and the gas phase, but since this is substantially equivalent to the gas phase, this may be included in the gas phase process without discrimination.

Since a low crystalline or amorphous propylene-ethylene random copolymer component (A2) tends to dissolve in an organic solvent such as hydrocarbon or liquid propylene, it is preferable to employ the gas phase process for a component (A2).

The crystalline propylene-ethylene random copolymer component (A1) can be produced by any process, but for the relatively less crystalline component (A1), it is preferable to employ the gas phase process in order to prevent a fouling trouble.

Consequently, it is most preferable to employ the continuous polymerization process and to produce a crystalline propylene-ethylene random copolymer component (A1) in the bulk phase or in the gas phase and then to produce a low crystalline or amorphous propylene-ethylene random copolymer elastomer component (A2) in the gas phase.

(2-3) Other Polymerization Conditions

Usual polymerization temperatures are applicable in general. Concretely, polymerization temperatures in the range of 0 to 200° C., preferably 40 to 100° C., are applicable.

Polymerization pressures depend on the process employed, and usual pressures are applicable in general. For example, polymerization pressures are in the range of 0 to 200

MPa, preferably 0.1 to 50 MPa. An addition of an inert gas such as nitrogen to the system is not limited.

When sequential polymerization is carried out to prepare a component (A1) in the first step and a component (A2) in the second step, it is preferable to add an activity suppressive reagent in the second step. In the production of a propylene-ethylene block copolymer, an addition of an activity suppressive reagent to the reactor where ethylene-propylene random copolymerization is carried out in the second step can improve powder characteristics (such as fluidity) and material properties such as gel content. There are various techniques in this field, examples of which are illustrated in JP-B-63-54296, JP-A-7-25960 and JP-A-2003-2939. It is preferable to apply these techniques to the present invention.

3. Adjustments of the Constituents of Propylene-Ethylene Block Copolymer (A)

Each factor of the propylene-ethylene block copolymer (A) to be used in the present invention can be adjusted in the following manner so as to satisfy the requirements for the present invention.

(1) Component (A1)

With regard to a crystalline propylene-ethylene random copolymer component (A1), it is necessary to adjust an ethylene content E(A1) and T(A1).

In the present invention, in order to adjust the E(A1) value within the desired range, the feed ratio of ethylene to propylene to the reactor in the first step has to be appropriately adjusted. Indeed the relationship between the feed ratio and the ethylene content in the obtained propylene-ethylene random copolymer (A) depends on the metallocene catalyst used, but the feed ratio of the monomers can be appropriately adjusted to prepare the component (A1) having an optional ethylene content E(A1). For example, in order to adjust the E(A1) value in the range of 0 to 7 wt %, the feed ratio of ethylene to propylene can be adjusted in the range of 0 to 0.3, preferably 0 to 0.2.

Because of the narrow crystallinity distribution of the component (A1), the T(A1) value is decreased as the E(A1) value is increased.

Accordingly, in order to adjust the T(A1) value so as to satisfy the claimed range, the E(A1) value has to be adjusted within the desired range on the basis of the relationship between them.

(2) Component (A2)

With regard to the low crystalline or amorphous propylene-ethylene random copolymer component (A2), it is necessary to adjust an ethylene content E(A2) and T(A2).

In the present invention, in order to adjust the E(A2) value within the desired range, the feed ratio of ethylene to propylene in the second step has to be appropriately adjusted in the same manner as in the E(A1) value adjustment. For example, in order to adjust the E(A2) value within the range of 5 to 20 wt %, the feed ratio of ethylene to propylene can be adjusted within the range of 0.01 to 5, preferably 0.05 to 2. Indeed, the crystallinity distribution of the component (A2) becomes somewhat broader in accordance with the increase of the ethylene content, but the T(A2) value is decreased in accordance with the increase of the E(A2) value in the same manner as described on the component (A1).

Accordingly, in order to adjust the T(A2) value so as to satisfy the claimed range, the E(A2) value has to be adjusted within the desired range on the basis of the relationship between E(A2) and T(A2).

(3) W(A1) and W(A2)

As far as amount W(A1) of the component (A1) and amount W(A2) of the component (A2) are concerned, the ratio of the amount of the component (A1) produced in the first step to the amount of the component (A2) produced in the second step can be adjusted to get an optional set of the W(A1) value and the W(A2) value. For example, it is possible to increase W(A1) and to decrease W(A2) by the operation that the production amount in the first step is held and the production amount in the second step is decreased, which can be easily controlled by the usual procedures in the second step, that is, reducing the residence time, lowering the polymerization temperature or increasing the feed of the activity suppressive reagent, and vice versa.

In order to set the practical conditions, it is necessary to consider the decay of the activity. Thus, in the range of the ethylene contents E(A1) and E(A2) in the present invention, generally, the polymerization activity tends to increase and the decay of the polymerization activity tends to be intensified along with the increase of the feed ratio of ethylene to propylene to raise an ethylene content. Accordingly, in order to keep the catalyst still active enough in the second step, it is necessary to suppress the polymerization activity in the first step. For example, the operation conditions can be set as the combination of the following typical procedures; reducing the production amount W(A1), and if necessary, lowering the polymerization temperature and/or reducing the polymerization time (residence time) in the first step, or increasing the ethylene content E(A2), increasing the production amount W(A2), and if necessary, raising the polymerization temperature and/or prolonging the polymerization time (residence time) in the second step.

(4) Glass Transition Temperature (Tg)

In the propylene-ethylene block copolymer (A) to be used in the present invention, it is necessary that the tan $\delta$ curve, as discussed above, should show a single peak. In order to make the tan $\delta$ curve show a single peak, E(gap) i.e. E(A2)-E(A1), which is defined as the difference between the ethylene content E(A1) in the component (A1) and the ethylene content E(A2) in the component (A2), is at most 20 wt %, preferably at most 18 wt %, more preferably at most 16 wt %, and E(gap) is decreased until a single peak is observed in actual measurement.

It is possible to obtain the polymer with the desired E(gap) value by the adjustment of the feed ratio of ethylene to propylene in the preparation of the component (A2), so as to make the ethylene content E(A2) of the low crystalline or amorphous copolymer component (A2) in the appropriate range according to the ethylene content E(A1) of the crystalline copolymer component (A1).

Further, Tg of the block copolymer having no phase-separated structure unlike the present invention is affected by the ethylene content E(A1) in the component (A1) and the ethylene content E(A2) in the component (A2) and the ratio of the amounts of both components. In the present invention, the amount of the component (A2) is 5 to 70 wt %. However, Tg is more affected by the ethylene content E(A2) in the component (A2) within this range.

Namely, Tg reflects a glass transition of an amorphous part. However, in the block copolymer component (A) of the present invention, the component (A1) has crystallinity and a relatively small amorphous part, whereas the component (A2) has low crystallinity or is amorphous, and most of it comprises an amorphous part.

Accordingly, a value of Tg is almost controlled by E(A2), and the control of E(A2) is as described above.

(5) Melt Flow Rate (MFR)

It is essential in the propylene-ethylene block copolymer (A) to be used in the present invention that the crystalline copolymer component (A1) and the low crystalline or amorphous copolymer elastomer component (A2) are miscible so as to maintain transparency. Therefore, mixing principle of apparent viscosity is generally established between viscosity [η]A1 of the component (A1), viscosity [η]A2 of the component (A2) and viscosity [η]W of the whole propylene-ethylene block copolymer (A). Namely, the following formula is generally established:

Log [η]W={W(A1)×Log [η]A1+W(A2)×Log [η]A2}/100

Generally, since there is a certain relationship between MFR and [η], MFR can be freely controlled by varying [η]A1 in accordance with the above formula when [η]A2, W(A1) and W(A2) are set at first in view of flexibility and heat resistance.

(6) T(A4)

T(A4) is an index of crystallinity distribution. As the crystallinity distribution of the component (A1) is narrower, T(A4) becomes closer to T(A1) (lower). Thus, to control T(A4) to be low is to control crystallinity distributions of the component (A1) and the component (A2) to be narrow.

Generally, a metallocene catalyst makes the crystallinity distribution of the obtained polymer narrower than a Ziegler-Natta catalyst, but in such a sequential polymerization system as in the present invention, it is not always sufficient to employ a metallocene catalyst to achieve the efficiently narrow crystallinity distribution.

In order to prepare the product propylene-ethylene block copolymer (A) having the desirable properties, it is necessary to make the component (A1) and the component (A2) have respectively different specific polymer compositions. Thus, it is necessary to adjust the polymerization conditions corresponding to the respective polymer compositions in the first step and in the second step, particularly to hold monomer gas compositions at respectively different specific values. Accordingly, if the employed process would tend to make the crystallinity distribution of the component (A2) broader, additional modifications would be necessary, for example, the modification of the polymer transfer system between vessels so as to prevent the carry-over of the specific monomer gas mixture in the first step into the second step. Specifically, in the polymer transfer system, by means of the increase of the purged gas flow or the dilution or the substitution of the reactive monomer gas mixture from the preceding reactor vessel with an inert gas such as nitrogen, the crystallinity distribution of the component (A2) becomes narrower. Thus, by the modification in the polymer transfer system, the T(A4) value can be controlled to be low.

W(Mw≦5,000)   (7)

Generally, a metallocene catalyst makes the molecular weight distribution of the obtained polymer narrower than a Ziegler-Natta catalyst. However, in such a sequential polymerization system as in the present invention, it is not always sufficient to employ a metallocene catalyst to make the molecular weight distribution narrow enough. Particularly, in order to prevent the formation of the low molecular weight component, it is possible to control the W(Mw≦5,000) value low independently from the polymerization conditions by means of the reduction of the duration in the polymer transfer system from the first step reactor vessel to the second one or the complete substitution of the reactive monomer gas mixture employed in the first step with an inert gas such as nitrogen in the polymer transfer step.

4. Optional Components (Additives)

In the polypropylene based heat shrinkable film of the present invention, an ethylene-α-olefin copolymer component may be incorporated for the purpose of improving the heat shrinkability and improving impact resistance. The amount of its addition is about 0 to 10 wt %. If it exceeds 10 wt %, transparency tends to be deteriorated.

The ethylene-α-olefin copolymer is a copolymer of ethylene with an α-olefin with a carbon number of from 3 to 12, and it has an ethylene content of preferably 95 to 60 wt %. If the ethylene content exceeds 95 wt %, no effects of improving heat shrinkability and impact resistance are likely to be obtained, and if it is lower than 60 wt %, transparency is likely to deteriorate.

Further, the density of the ethylene-α-olefin copolymer is preferably 0.870 to 0.920 g/cm$^3$. If the density is lower than 0.870 g/cm$^3$, stickiness tends to be significant and blocking resistance tends to deteriorate, and if it is higher than 0.920 g/cm$^3$, no effects of improving heat shrinkability and impact resistance tend to be obtained.

Further, to the polypropylene based heat shrinkable film of the present invention, an alicyclic hydrocarbon resin such as a petroleum resin, a terpene resin, a rosin resin, a coumarone-indene resin or a hydrogenated derivative thereof, or an amorphous cyclic olefin resin, may, for example, be added for the purpose of improving heat shrinkability.

The alicyclic hydrocarbon resin is preferably a resin having no polar groups or a hydrogenated resin having a hydrogenation ratio of at least 95%. A more preferred resin is a petroleum resin or a hydrogenated derivative of a petroleum resin, and the petroleum resin may, for example, be a commercial product such as ARKON manufactured by Arakawa Chemical Industries Ltd. or Opera manufactured by Exxon Mobil Corporation.

The amorphous cyclic olefin resin may be a polymer such as cyclopentadiene or tetracyclododecene or a copolymer comprising such a monomer as the main component and its commercial product may, for example, be APEL manufactured by Mitsui Chemicals, Inc. or ZEONOR manufactured by ZEON Corporation.

The amount of addition is about 0 to 50 wt %, preferably 5 to 30 wt %. If it is much larger than 50 wt %, the specific gravity tends to be high, stickiness is likely to occur at the time of molding and further, flexibility of the film is likely to be impaired.

Further, the alicyclic hydrocarbon resin or the amorphous cyclic olefin resin is preferably one having a softening temperature of at least 110° C. and at most 160° C. or a glass transition temperature of at least 50° C. and at most 120° C. in view of improvement in heat shrinkability and securement of transparency.

To the polypropylene based heat shrinkable film of the present invention, various known additives to be used as compounding ingredients for a polyolefin resin, such as a nucleating agent, an antioxidant, a neutralizing agent, a light stabilizer, an UV stabilizer, an anti-blocking agent, a lubricant, an antistatic agent, a metal deactivating agent, a peroxide, a filler, an antibacterial and mildew-proofing agent and a fluorescent whitening agent, may be added within a range not to impair the effects of the present invention. The amount of such additives is generally 0.0001 to 3 wt %, preferably 0.001 to 1 wt %.

5. Polypropylene Based Heat Shrinkable Film (1) Production of Film

The polypropylene based heat shrinkable film of the present invention is produced by orienting a non-oriented sheet containing the propylene-ethylene block copolymer (A) in at least one layer at least uniaxially, preferably followed by aging to control the shrinkage factor with time.

(2) Production of Non-Oriented Sheet

For production of a non-oriented sheet, a known film or sheet formation method may be employed. Specifically, the method may, for example, be cast molding comprising plasticizing a material by an extruder and cooling and solidifying the resin melt-extruded from a T-die by means of an air knife and a cooling roll, sheet forming comprising nipping the resin by two or more cooling rolls and cooling and solidifying it, or blown film extrusion comprising cooling and solidifying the resin melt-extruded from a cyclic die with air or water.

(3) Orientation Method

Orientation may be carried out by a known means, such as a tubular method, a Tenter orientation method, a roll orientation method utilizing the difference in rate between rolls or a pantagraph type batch orientation method.

As one example of the orientation method, a method of orienting a sheet obtained by a T-die method from about 1.0 to about 5.0 times by rolls, and orienting the sheet from about 4.0 to 10.0 times by a Tenter method, may be mentioned.

Further, as another example of the orientation method, an orientation method by a so-called tubular method may be mentioned, wherein a tubular non-oriented sheet obtained from a cyclic die by an air cooling or water-cooling method is heated to at most the melting temperature, and then oriented by air in the bubble-like from about 3.0 to about 7.0 times in the lengthwise direction and from about 3.0 to about 7.0 times in the laternal direction.

Orientation is carried out preferably at a temperature as low as possible so long as no orientation failure occurs, for the purpose of improving the shrinkage factor. Particularly in a case where orientation comprises a step of preheating the non-oriented sheet, the preheat temperature is preferably as low as possible within a range where molding is possible, from the viewpoint of improving the shrinkage factor.

The propylene-ethylene block copolymer (A) to be used in the present invention has narrow crystallinity distribution to the high crystalline component side since it is produced by employing a metallocene catalyst, and is thereby characterized in that film breakage is less likely to occur even when the orientation temperature is lowered relative to the melting point. Accordingly, the oriented film of the present invention is formed preferably at an orientation temperature lower by at least 20° C. than the melting point of the block copolymer, in view of quality.

After orientation, it is preferred to carry out known heat treatment such as so-called aging, so as to suppress the shrinkage factor with time. The condition of the heat treatment such as aging can be suitably set in view of the balance between the shrinkage factor with age and the heat shrinkage factor.

(4) Multi-Layer Film

The polypropylene based heat shrinkable film of the present invention may be used in the form of a multi-layer film so as to satisfy various requirements in addition to shrinkage characteristics. The multi-layer film may, for example, be one having a known sealant resin laminated on the surface layer so as to improve heat sealing properties and decrease blocking, or one having a known barrier material such as PVDC or EVOH laminated so as to impart barrier properties.

Further, for the purpose of further improving the heat shrinkage factor and imparting sealing properties by a solvent, a resin composition may be laminated, comprising from 50 to 100 wt %, preferably from 60 to 90 wt % of a cyclic olefin resin selected from cyclic olefin resins containing as the main component a cyclic olefin polymer comprising a cyclic olefin compound and/or ethylene, a polymer obtained by a ring-opening polymerization of a cyclic olefin compound or its hydrogenated product, having a glass transition temperature of from 40 to 100° C., preferably from 50 to 90° C. and a MFR (260° C., 2.16 kg load) of from 10 to 50 g/10 min, preferably from 15 to 35 g/10 min; and from 0 to 50 wt %, preferably from 10 to 40 wt % of a linear low density polyethylene catalyzed by a metallocene catalyst, having a specific gravity of from 0.88 to 0.93, preferably from 0.90 to 0.92 and a MFR (190° C., 2.16 kg load) of from 1.0 to 10 g/10 min, preferably from 1.5 to 5.0 g/10 min.

In such a case, the film tends to be fragile by lamination of a cyclic olefin resin selected from cyclic olefin resins containing as the main component the cyclic olefin polymer comprising a cyclic olefin compound and/or ethylene, a polymer obtained by ring-opening polymerization of a cyclic olefin compound or its hydrogenated product, and further, the film tends to have deteriorated transparency by incorporating the linear low density polyethylene. Thus, the amount of the linear low density polyethylene should be adjusted considering the balance of the heat shrinkability, the solvent sealing properties and transparency.

The cyclic olefin resin selected from the cyclic olefin resins containing as the main component a cyclic olefin polymer comprising a cyclic olefin compound and/or ethylene, a polymer obtained by ring-opening polymerization of a cyclic olefin compound or its hydrogenated product, may be a polymer of e.g. cyclopentadiene or tetracyclododecene or a copolymer comprising such a monomer as the main component, and a commercial product thereof may, for example, be APEL manufactured by Mitsui Chemicals, Inc. or ZEONOR manufactured by ZEON Corporation.

The lamination method for such a multi-layer film may, for example, be a multi-layer coextrusion method or an in-line lamination method, and preferred is a multi-layer coextrusion method with a view to simplifying production facilities. Further, to the surface layer of the multi-layer film, known additives such as an anti-blocking agent, a slipping agent or an antistatic agent may be suitably added for the purpose of controlling the surface properties.

EXAMPLES

Now, the present invention will described in further detail with reference to Examples and Comparative Examples. However, it should be understood that the present invention is by no means restricted to such specific Examples.

Evaluation methods and resins used in Examples and Comparative Examples are as follows.

(Method of Measuring Physical Properties of Propylene-Ethylene Block Copolymer (A))

1) Melt Flow Rate (MFR)

It was measured under the following conditions in accordance with JIS K7210, method A condition M.

Test temperature: 230° C.

Nominal load: 2.16 kg

Die shape: diameter 2.095 mm, length 8.00 mm

2) TREF

A sample is dissolved in o-dichlorobenzene (including 0.5 mg/ml of BHT) at 140° C. to prepare a solution. The solution is introduced into a TREF column at 140° C. and cooled to 100° C. at a cooling rate of 8° C./min, and is further cooled to −15° C. at a cooling rate of 4° C./min and is maintained for 60 minutes. Then, o-dichlorobenzene (including 0.5 mg/ml of BHT) as a solvent is flowed through the column at a flow rate of 1 ml/min, so that a component dissolved in o-dichlorobenzene at −15° C. in the TREF column is eluted for 10 minutes. Then, the column is linearly heated at a heating rate of 100° C./hour to 140° C. to obtain an elution curve.

Apparatus (TREF Part)

TREF column: 4.3 mm diameter, 150 mm length stainless steel column

Column filler: 100 µm glass beads having a surface subjected to inert treatment

Heating system: Aluminum heating block

Cooling system: Peltier element (cooling of Peltier element is made by water cooling)
Temperature distribution: +0.5° C.
Temperature controlling device: Digital program adjuster KP1000 (valve oven) manufactured by Chino Corporation
Heating system: Air bath system oven
Temperature at the time of measurement: 140° C.
Temperature distribution: +1° C.
Valve: 6-forked valve, 4-forked valve
(Sample Charging Part)
Charging system: Loop charging system
Charging amount: Loop size 0.1 ml
Charging inlet heating system: Aluminum heating block
Temperature at the time of measuring: 140° C.
(Detection Part)
Detector: Wavelength fixed type infrared detector MIRAN 1A manufactured by FOXBORO Company Detecting wavelength: 3.42 μm
High temperature flow cell: Micro flow cell for LC-IR, optical path length 1.5 mm, shape of window: 2 mm diameter×4 mm oval, synthetic sapphire window plate
Measurement temperature: 140° C.
(Pump Part)
Pump: SSC-3461 pump manufactured by Senshu Scientific Co., Ltd.
Measuring Conditions
Solvent: o-dichlorobenzene (including 0.5 mg/ml of BHT)
Sample concentration: 5 mg/ml
Sample charging amount: 0.1 ml
Solvent flow rate: 1 ml/min 3) Dynamic Mechanical Analysis A strip-like piece of 10 mm width×18 mm length×2 mm thickness cut from a sheet of 2 mm thickness injection-molded under the following conditions was used as a test piece. ARES manufactured by Rheometric Scientific inc. was used as a test apparatus. A frequency of 1 Hz was employed. A measurement temperature was raised step by step from −60° C., and the measurement was carried out until the test piece was melted to be impossible for measurement. A strain was controlled within a range of 0.1 to 0.5%.

(Preparation of Test Piece)
Standard number: JIS-7152 (ISO294-1)
Molding machine: TU-15 injection-molding machine manufactured by Toyo machinery & metal Co., Ltd.
Molding machine set temperature: (hopper side) 80, 80, 160, 200, 200 and 200° C.
Mold temperature: 40° C.
Injection speed: 200 mm/sec (speed in a mold cavity)
Injection pressure: 800 kgf/cm$^2$
Maintenance pressure: 800 kgf/cm$^2$
Pressure maintaining time: 40 sec.
Mold shape: Flat plate (thickness 2 mm, width 30 mm and length 90 mm)

4) DSC

By using DSC instrument manufactured by Seiko Instruments Inc., 5.0 mg of a sample was weight and maintained at 200° C. for 5 min. Thereafter, the sample was crystallized by lowering the temperature at a rate of 10° C./min to 40° C., and the crystallized sample was heated by raising the temperature at a rate of 10° C./min to 200° C. to measure a melting peak temperature Tm (unit: ° C.). From an area of endothermic curve at the time of raising the temperature, dHm was determined.

5) GPC

A weight average molecular weight (Mw) and a number average molecular weight (Mn) were measured by gel permeation chromatography (GPC) method.

Calculation from a retention volume to a molecular weight is carried out by a previously prepared analytical curve of standard polystyrene.
The measurement method is fully described heretofore.

6) Calculation of Ethylene Content

It is carried out by a method predescribed heretofore.

7) Heat Resistance

Heat resistance of the block copolymer (A) was evaluated under the following conditions employing a test piece used for dynamic mechanical analysis.
Standard number: JIS K7206 (in accordance with method 50 except that the load was 250 g)
Measuring apparatus: Full automatic HDT measuring apparatus (manufactured by Toyo Seiki Seisaku-sho, Ltd.)
Shape of test specimen: two flat plates of 25 mm×25 mm and 2 mm in thickness overlayed
Preparation of test piece: the above flat plates were punched out from an injection-molded flat plate
Conditions: a test piece was left for at least 24 hours in a constant temperature chamber adjusted at room temperature 23° C. and humidity 50%
(Without Annealing)
Test load: 250 g
Temperature-raising rate: 50° C./hour
Number of test pieces: 3

Production Example PP-1

Polymer Production Example A-1

Preparation of Prepolymerized Catalyst
(Chemical Treatment of Silicate)

3.75 liters of distilled water and then 2.5 kg of concentrated sulfuric acid (96%) were slowly added to a glass-made separable flask of 10 liters equipped with a stirring vane. 1 kg of montmorillonite (Benclay SL manufactured by Mizusawa Industrial Chemicals, Ltd.: average particle size=25 μm, particle size distribution=10-60 μm) was dispersed therein at 50° C., and the resultant slurry was heated to 90° C. and was maintained at that temperature for 6.5 hours. After cooling to 50° C., the slurry was filtrated under a reduced pressure to recover a cake. The cake was dispersed with 7 Liters of distilled water, followed by filtration. This washing procedure was repeated until a pH value of a washing liquid (filtrate) exceeded 3.5. The cake thus recovered was dried at 110° C. in nitrogen atmosphere overnight. After drying, 707 g of silicate was obtained.

(Drying of Silicate)

The above chemically treated silicate was dried by a kiln drier under the following conditions.
Rotatory cylinder: Cylinder-like, inner diameter 50 mm, heating zone 550 mm (electric furnace); rotation number of scraping vane: 2 rpm; inclination angle: 20/520; supplying rate of silicate: 2.5 g/min; gas flow rate: nitrogen 96 liters/hour; counter current drying temperature: 200° C. (powder temperature)

(Preparation of Catalyst)

The interior of an autoclave equipped with a stirring apparatus and a temperature controlling apparatus and having an inside volume of 16 liters, was sufficiently replaced with nitrogen. 200 g of dry silicate was introduced into the autoclave, 1,160 ml of mixed heptane and 840 ml of heptane solution (0.60 M) of triethyl aluminum were added thereto, and the resultant mixture was stirred at room temperature. After one hour, the mixture was washed with mixed heptane and 2,000 ml of silicate slurry was prepared. Thereafter, 9.6 ml of heptane solution (0.71 ML) of triisobutyl aluminum was added to the above prepared silicate slurry, and the resultant mixture was reacted at 25° C. for 1 hour. On the other hand, 2,180 mg (0.3 mM) of (r)-dichloro[1,1'-dimethylsilylenebis{2-methyl-4-(4-chlorophenyl)-4H-azulenyl}]zirconium in 870 ml of mixed heptane was treated with 33.1 ml of heptane solution (0.71 M) of triisobutyl aluminum at room temperature for 1 hour. This crude product was added to the silicate slurry, and after stirring for 1 hour, mixed heptane was further added to the slurry to make 5,000 ml.

(Prepolymerization/Washing)

Then, the temperature in the autoclave was increased to 40° C., and when the temperature was stabilized at 40° C., propylene was supplied at a rate of 100 g/hour holding the reaction temperature at 40° C. After four hours, supplying of propylene was stopped, and prepolymerization was continued for further 2 hours.

After completion of prepolymerization, the remaining monomer was purged out and stirring was stopped. The reaction mixture was settled for about 10 minutes, and 2,400 ml of the supernatant liquid was decanted off. Thereafter, 9.5 ml of heptane solution (0.71 ML) of triisobutyl aluminum and then 5,600 ml of mixed heptane were added thereto, and the reaction mixture was stirred at 40° C. for 30 minutes and settled for 10 minutes. Thereafter, 5,600 ml of the supernatant liquid was removed. Further, this procedure was repeated three times. As a result of analysis of the last washing solvent, the organic aluminum compounds and Zr were contained at the concentration of 1.23 mmol/L and $8.6 \times 10^{-6}$ g/L respectively, which corresponds to 0.016% of the charge. After adding 170 ml of heptane solution of triisobutyl aluminum (0.71 ML), this product was dried at 45° C. in vacuum. The prepolymerized catalyst containing 2.0 g of polypropylene per gram of catalyst was obtained.

First Step

In the first step, propylene-ethylene random copolymerization was carried out employing a liquid phase reactor equipped with a stirring apparatus having an inside volume of 0.4 $m^3$. Liquid propylene, liquid ethylene and triisobutyl aluminum were continuously supplied respectively at rates of 90 kg/hour, 4.2 kg/hour and 21.2 g/hour. The hydrogen supply amount was adjusted so that an aimed MFR in the first step could be achieved. Further, the above prepared prepolymerized catalyst was supplied at 6.9 g/hour as a catalyst (excluding the weight of the prepolymerized polymer). Further, the reactor was cooled so that the polymerization temperature would be 45° C.

The propylene-ethylene random copolymer (A1) obtained in the first step was analyzed and as a result, BD (bulk density) was 0.46 g/cc, MFR was 2.0 g/10 min, and the ethylene content was 3.7 wt %.

Second Step

In the second step, propylene-ethylene random copolymerization was carried out employing a stirring type gas phase reactor having an inside volume of 0.5 $m^3$. The slurry including polymer particles was continuously drawn from the liquid phase reactor in the first step, with flashing of liquid propylene, followed by compression by nitrogen, and the slurry was transferred to the gas phase reactor.

Reaction conditions were held as follows: reaction temperature in the reactor at 80° C., total pressure of propylene, ethylene and hydrogen at 1.5 MPa, in which volume fractions of propylene, ethylene and hydrogen were 66.97 vol %, 32.99 vol % and 420 volppm, respectively.

As an activity suppressing reagent, ethanol was supplied to the gas phase reactor. Molar ratio of the supplied ethanol to aluminum as TiBA accompanying the polymer particles transferred to the gas phase reactor was held at 0.3 mol/mol.

The final propylene-ethylene block copolymer (A) was analyzed and as a result, showed following features: Activity 8.7 kg/g-catalyst, BD (bulk density) 0.41 g/cc, MFR 2.0 g/10 min, ethylene content 8.7 wt %.

Pellets PP-1

(Granulation)

To the propylene-ethylene block copolymer (A) powder obtained in the Polymer Production Example A-1, an antioxidant, a neutralizing agent, an anti-blocking agent and a lubricant were added, and sufficiently stirred and mixed by a blender.

Antioxidant: 0.05 part by weight of tetrakis[methylene-3-(3',5'-di-t-butyl-4'-hydroxyphenyl)propionate]methane (IRGANOX 1010 manufactured by Ciba Specialty Chemicals), 0.10 part by weight of tris(2,4-di-t-butylphenyl)phosphite (IRGAFOS 168, manufactured by Ciba Specialty Chemicals)

Neutralizing agent: 0.05 part by weight of calcium stearate (calcium stearate G manufactured by NOF Corporation)

Anti-blocking agent: 0.40 part by weight of synthetic silica (SYLISIA 430 manufactured by FUJI SILYSIA CHEMICAL LTD.)

Lubricant: 0.30 part by weight of oleic amide (NEUTRON manufactured by NIPPON FINE CHEMICAL CO., LTD.)

The copolymer powder to which the additives were added were mixed at high speed of 750 rpm for one minute at room temperature by a Henschel mixer, and melt kneaded by a PCM twin screw extruder manufactured by Ikegai Ltd., with a screw aperture of 30 mm at a number of revolution of screw of 200 rpm at a discharge of 10 kg/hr at an extruder temperature of 190° C. The molten resin extruded from a strand die was drawn while cooled and solidified in a cooling water bath, and the strand was cut by a strand cutter into a diameter of about 2 mm and a length of about 3 mm to obtain material pellets (PP-1) of the propylene-ethylene copolymer (A).

(Analysis)

With respect to the obtained PP-1 pellets, TREF, the ethylene content, DSC, GPC, dynamic mechanical analysis and heat resistance were measured.

Data obtained by measurement are shown in Table 4.

From the obtained measurement results, it can be said that PP-1 satisfies all the requirements for the component (A).

With respect to the TREF measurement results, an elution curve is shown in FIG. 1 so as to identify each parameter. Further, with respect to the results of dynamic mechanical analysis, changes in the storage modulus G', loss modulus G' and the loss tangent tan δ to a temperature are shown in FIG. 2 so as to identify each parameter.

Polymer Production Example A-2

A propylene-ethylene block copolymer (A) was produced in the same manner as Polymer Production Example A-1 except that the polymerization conditions were changed. Polymerization conditions and polymerization results are shown in Table 3.

(Pellets PP-2)

Pellets PP-2 were obtained using the obtained propylene-ethylene block copolymer (A) powder with the same additives under the same granulation conditions as for the pellets PP-1. The analysis results are shown in Table 4.

Polymer Production Example A-3

A propylene-ethylene block copolymer was produced in the same manner as Polymer Production Example A-1 except that the polymerization conditions were changed. Polymerization conditions and polymerization results are shown in Table 3.

(Pellets PP-3)

Pellets PP-3 were obtained using the obtained propylene-ethylene block copolymer powder with the same additives under the same granulation conditions as for the pellets PP-1. The analysis results are shown in Table 4.

Polymer Production Example A-4

Polymerization was carried out in the same manner as in Polymer Production Example A-1 except that only first step was carried out and no second step was carried out, to produce a propylene-ethylene random copolymer. Polymerization conditions and polymerization results are shown in Table 3.

(Pellets PP-4)

Pellets PP-4 were obtained by using the obtained propylene-ethylene random copolymer powder with the same additives under the same granulation conditions as for the pellets PP-1. The analysis results are shown in Table 4.

Polymer Production Example A-5

(Preparation of Solid Catalyst Component)

2,000 ml of dried and deoxidized n-heptane was charged into a flask sufficiently purged with nitrogen. 2.6 mol of $MgCl_2$ and 5.2 mol of $Ti(O-n-C_4H_9)_4$ were introduced therein and reacted at 95° C. for 2 hours. After the reaction mixture was cooled to 40° C., 320 ml of methyl hydropolysiloxane (20 cs) was introduced into the flask and reacted for 3 hours. Produced solid component was washed with n-heptane.

4,000 ml of n-heptane purified as described above was charged into a flask sufficiently purged with nitrogen. The solid component formed above in an amount equivalent to 1.46 mol of Mg, was introduced to the flask. Then, a mixture of 2.62 mol of $SiCl_4$ and 25 ml of n-heptane was dropped into the flask at 30° C. for half an hour, and reacted at 70° C. for 3 hours, followed by washing with n-heptane. Thereafter, a mixture of 0.15 mol of phthalyl chloride and 25 ml of n-heptane was dropped into the flask at 70° C. for half an hour, and reacted at 90° C. for one hour, followed by washing with n-heptane. And then 11.4 mol of $TiCl_4$ was introduced to the flask and reacted at 110° C. for 3 hours, followed by washing with n-heptane, to obtain a solid component (A1), which had a titanium content of 2.0 wt %.

An autoclave equipped with a stirring apparatus and a temperature controlling apparatus, having an inside volume of 16 L, was sufficiently purged with nitrogen. 5,000 ml of n-heptane purified as described above was charged therein, and 100 g of the solid component (A1) synthesized above was introduced therein. 0.875 mol of $SiCl_4$ was introduced therein and reacted at 90° C. for 2 hours. After completion of the reaction, 0.15 mol of $(CH_2=CH)Si(CH_3)_3$, 0.075 mol of $(t-C_4H_9)(CH_3)Si(OCH_3)_2$ and 0.4 mol of $Al(C_2H_5)_3$ were introduced into the flask in this order, and contacted at 30° C. for 2 hours. After completion of the contact, the product was sufficiently washed with n-heptane to give a solid catalyst component (A) containing magnesium chloride as a major component. This product had a titanium content of 1.8 wt %.

(Prepolymerization)

An autoclave equipped with a stirring apparatus and a temperature controlling apparatus and having an inside volume of 16 L was sufficiently purged with nitrogen. The above prepared n-heptane slurry of the solid catalyst component (A) in an amount of 100 g of the solid catalyst component (A) was introduced thereinto, and n-heptane was further introduced to adjust the amount of liquid to be 5,000 ml. Then, the temperature in the reactor was adjusted at 15° C., and a n-heptane solution of triethyl aluminum (10 wt %) in an amount of 0.1 mol of $Al(C_2H_5)$ was added. Then, propylene was supplied at a rate of 50 g/hour for 2 hours to carry out prepolymerization. After completion of prepolymerization, the remaining monomer was purged out, and the solid catalyst was sufficiently washed with n-heptane. After completion of washing, vacuum drying was carried out to obtain a prepolymerized catalyst. In the prepolymerized catalyst, 2.0 g of polypropylene was contained per gram of catalyst.

A propylene-ethylene block copolymer was produced in the same manner as Polymer Production Example A-1 except that the above obtained prepolymerized catalyst was used, that triethyl aluminum instead of triisobutyl aluminum was continuously supplied at 10 g/hour and that polymerization conditions as identified in Table 3 were employed. The polymerization results are shown in Table 3.

(Pellets PP-5)

Pellets PP-5 were obtained using the obtained propylene-ethylene block copolymer powder with the same additives under the same granulation conditions as for the pellets PP-1. The analysis results are shown in Table 4.

TABLE 3

| | | | | PP-1 Production Example A-1 | PP-2 Production Example A-2 | PP-3 Production Example A-3 | PP-4 Production Example A-4 | PP-5 Production Example A-5 |
|---|---|---|---|---|---|---|---|---|
| Polymerization conditions | 1st step | Catalyst amount (pre-polymer is excluded) | g-catalyst/hr | 7.9 | 5.1 | 7.9 | 7.9 | 2.2 |
| | | Temp | ° C. | 45 | 65 | 45 | 45 | 60 |
| | | Introduced Ethylene | kg/hr | 4.2 | 3.0 | 4.2 | 4.2 | 1.2 |
| | | Introduced propylene | kg/hr | 90 | 90 | 90 | 90 | 90 |
| | 2nd step | Temp | ° C. | 80 | 80 | 80 | — | 80 |
| | | Pressure | MPaG | 1.5 | 1.5 | 1.5 | — | 1.5 |
| | | Ethylene concentration | vol % | 32.99 | 29.00 | 46.99 | — | 19.86 |
| | | Propylene concentration | vol % | 66.99 | 70.98 | 52.99 | — | 79.84 |
| | | Hydrogen concentration | ppm | 150 | 150 | 150 | — | 2,000 |

TABLE 3-continued

|  |  |  |  | PP-1 Production Example A-1 | PP-2 Production Example A-2 | PP-3 Production Example A-3 | PP-4 Production Example A-4 | PP-5 Production Example A-5 |
|---|---|---|---|---|---|---|---|---|
| Polymerization results | After 1st step | Ethylene content | wt % | 3.7 | 2.2 | 3.7 | 3.7 | 3.7 |
|  |  | MFR | g/10 min | 2.0 | 2.0 | 2.0 | 2.0 | 2.0 |
|  | After 2nd step | Ethylene content | wt % | 8.7 | 7.2 | 11.7 | 3.7 | 8.7 |
|  |  | MFR | g/10 min | 2.0 | 2.0 | 2.0 | 2.0 | 2.0 |
|  |  | Activity | kg/g-catalyst | 7.6 | 11.7 | 3.8 | 3.8 | 13.6 |

TABLE 4

|  |  |  |  | Unit | PP-1 | PP-2 | PP-3 | PP-4 | PP-5 |
|---|---|---|---|---|---|---|---|---|---|
| MFR |  |  |  | g/10 min | 2.0 | 2.0 | 2.0 | 2.0 | 2.0 |
| TREF | T(A1) |  | Peak temp. of comp (A1) | ° C. | 76.2 | 86.3 | 76.2 | 76.2 | 95.4 |
|  | T(A4) |  | 99 wt % elution temp. | ° C. | 79.3 | 88.7 | 79.3 | 80.6 | 101.0 |
|  | T(A2) |  | Peak temp. of comp (A2) | ° C. | 23.6 | 25.4 | 16.4 | — | 9.0 |
|  | W(A1) |  | Weight fraction of comp (A1) | wt % | 50 | 50 | 50 | — | 50 |
|  | W(A2) |  | Weight fraction of comp (A2) | wt % | 50 | 50 | 50 | — | 50 |
| NMR | E(A1) |  | Ethylene content of comp (A1) | wt % | 3.7 | 2.2 | 3.7 | 3.7 | 3.7 |
|  | E(A2) |  | Ethylene content of comp (A2) | wt % | 13.7 | 12.2 | 19.7 | — | 13.7 |
|  | E(gap) |  | =E(A2) − E(A1) | wt % | 10.0 | 10.0 | 16.0 | — | 10.0 |
|  | E(w) |  | Ethylene content of block copolymer | wt % | 8.7 | 7.2 | 11.7 | 3.7 | 8.7 |
| DMA | Tg |  | Glass transition temperature | ° C. | −16.4 | −13.8 | −12.4 −33 | 1.8 | −16 |
| DSC | Tm |  | Melting point | ° C. | 123.2 | 133.2 | 123.2 | 123.2 | 139 |
|  | dHm |  | Heat of fusion | mJ/mg | 30.6 | 35.6 | 30.6 | 61.2 | 38 |
| GPC | Mw |  | Weight average molecular weight | ×10⁵ | 3.6 | 3.6 | 3.6 | 3.6 | 3.6 |
|  | Mn |  | Number average molecular weight | ×10⁵ | 1.3 | 1.3 | 1.3 | 1.3 | 1.1 |
|  | M(Mw < 5,000) |  |  | wt % | 0.1 | 0.1 | 0.1 | 0.1 | 0.9 |
| Heat resistance |  |  |  | ° C. | 111.5 | 121.6 | 113.2 | 111.7 | 118.9 |

Example 1

A polypropylene based heat shrinkable film was formed using the obtained pellets PP-1 as a material under the following conditions.

(Production of Heat Shrinkable Film)

(1) Formation of Non-Oriented Sheet

PP-1 was melt-extruded from a T-die by using a single screw extruder at a molding temperature of 220° C. and cooled and solidified by cooling rolls at 15° C. to obtain a non-oriented sheet having a thickness of 400 μm.

(2) Formation of Oriented Film

The non-oriented sheet was introduced into a Tenter furnace, preheated at 100° C. for 30 seconds and oriented 6.5 times in the width direction over a period of 30 seconds at the same temperature as the preheat temperature, and then annealed at 85° C. for 30 seconds while relaxed 7.5% in the width direction in the same Tenter furnace. A heat shrinkable film having a thickness of 60 μm with a drawing ratio of 6 times was obtained. The obtained heat shrinkable film was left to stand at 40° C. for one day to prepare an evaluation sample.

(Evaluation of Film Physical Properties)

1) Heat shrinkage factor: A 10 cm square sample piece was cut out so that one side thereof was in parallel with the machine direction of the film, and immersed in an oil bath heated at a predetermined temperature (80° C., 90° C., 100° C., 110° C., 120° C., 140° C.) for 10 seconds. Immediately after 10 seconds, it was immersed in another oil bath at 25° C. for 20 seconds, and the length in a direction at right angles to the machine direction of the film was measured.

2) Haze (unit: %): Transparency of the obtained oriented film was evaluated by measuring the haze. The measuring method was in accordance with JIS K7136-2000.

3) Tensile modulus (unit: MPa): It was measured in the machine direction (MD) and a transverse direction (TD) of the film under the following conditions to obtain the scale of the film rigidity. The tensile modulus was calculated in accordance with JIS K-7127-1999.

Sample length: 150 mm
Sample width: 15 mm
Distance between chucks: 100 mm
Crosshead speed: 1 mm/min 4) Flexibility after shrinkage: The tensile modulus of the film after shrinkage employed for measurement of 1) heat shrinkage factor (120° C.) was measured in the same manner as in 3) in accordance with JIS K-7127-1999.

5) Anti-Blocking Property

About 50 heat shrinkable films were overlayed and left to stand at 23° C. under a humidity of 50% for one month, which were subjected to evaluation. Evaluation standards are as follows. ○: No or a very small extent of blocking observed and X: blocking clearly observed.

results of the obtained heat shrinkable film are shown in Table 5. Since polymerization was not catalyzed by a metallocene catalyst, the film had significant stickiness, and blocking occurred. Further, the film was poor in the heat shrinkage factor.

TABLE 5

|  |  | Unit | Ex. 1 PP-1 | Ex. 2 PP-2 | Comp. Ex. 1 PP-3 | Comp. Ex. 2 PP-4 | Comp. Ex. 3 PP-5 |
|---|---|---|---|---|---|---|---|
| Film thickness |  | μm | 60 | 60 | 60 | 60 | 60 |
| Heat shrinkage factor |  | % |  |  |  |  |  |
| Shrinkage temperature | 80 | ° C. | 6.9 | 6.1 | 3.0 | 3.5 | 2.5 |
|  | 90 | ° C. | 14.2 | 12.5 | 7.5 | 8.0 | 4.3 |
|  | 100 | ° C. | 20.6 | 18.5 | 10.2 | 14.0 | 6.8 |
|  | 120 | ° C. | 43.0 | 40.0 | 28.5 | 35.0 | 18.3 |
|  | 140 | ° C. | Measurement impossible | 62 | Measurement impossible | Measurement impossible | 35.4 |
| Transparency (haze) |  | % | 2.3 | 2.4 | 15.5 | 2.7 | 4.2 |
| Film modulus | MD | MPa | 350 | 500 | 180 | 1,100 | 330 |
|  | TD | MPa | 530 | 750 | 270 | 1,700 | 460 |
| Modulus after shrinkage | MD | MPa | 240 | 330 | 120 | 740 | 300 |
|  | TD | MPa | 250 | 350 | 130 | 780 | 330 |
| Blocking |  |  | ○ | ○ | ○ | ○ | X |

Example 2

A polypropylene based heat shrinkable film was obtained in the same manner as in Example 1 except that the pellets PP-2 were used instead of the pellets PP-1. The evaluation results of the obtained heat shrinkable film are shown in Table 5.

Comparative Example 1

A polypropylene based heat shrinkable film was obtained in the same manner as in Example 1 except that the pellets PP-3 were used instead of the pellets PP-1. The evaluation results of the obtained heat shrinkable film are shown in Table 5. The tan σ curve had a plurality of peaks, which indicates that the film was poor in transparency.

Comparative Example 2

A polypropylene based heat shrinkable film was obtained in the same manner as in Example 1 except that the pellets PP-4 were used instead of the pellets PP-1. The evaluation results of the obtained heat shrinkable film are shown in Table 5. Since the pellets were obtained by using a random copolymer, not a block copolymer, the film was poor in flexibility as compared with Examples, and was also poor in the heat shrinkage factor.

Comparative Example 3

A polypropylene based heat shrinkable film was obtained in the same manner as in Example 1 except that the pellets PP-5 were used instead of the pellets PP-1. The evaluation

Example 3

(1) Formation of Non-Oriented Sheet

Using a T-die for three layers having an extruder 1 for surface layer, an extruder 2 for surface layer and an extruder 3 for interlayer connected, WFX4T manufactured by Japan Polypropylene Corporation (propylene-ethylene random copolymer catalyzed by a metallocene catalyst, MFR7, melting temperature 125.2° C.) as a resin for surface layer was charged into the extruder 1 and the extruder 2 and a resin composition for interlayer was charged into the extruder 3, and they were melt-extruded at 220° C. and cooled and solidified by cooling rolls at 15° C. to obtain a non-oriented sheet having a thickness of 400 μm consisting of three layers. The thickness ratio or three layers was 1/8/1.

(2) Formation of Oriented Film

The above non-oriented sheet was introduced into a Tenter furnace, preheated at a minimum temperature at which orientation was possible for 30 seconds, and oriented 6.5 times in the width direction over a period of 30 seconds at the same temperature as the preheat temperature, and then annealed at 85° C. for 30 seconds while relaxed 7.5% in the width direction in the same Tenter furnace. A heat shrinkable film having a thickness of 60 μm with a drawing ratio of 6 times was obtained. The obtained heat shrinkable film was left to stand at 40° C. for one day to prepare an evaluation sample.

To 100 parts by weight of a resin mixture comprising 75 wt % of the pellets PP-1 and 25 wt % of a petroleum resin (ALCON P125) manufactured by Arakawa Chemical Industries Ltd., 0.05 part by weight of tetrakis[methylene-3-(31,5'-di-t-butyl-4'-hydroxyphenyl)propionate]methane (IRGANOX 1010 manufactured by Ciba Specialty Chemicals) and 0.05 part by weight of tris(2,4-di-t-butylphenyl)phosphite (IRGAFOS 168, manufactured by Ciba Specialty Chemicals) as antioxidants were added, followed by high speed mixing at 750 rpm for one minute at room temperature by a Henschel mixer, and the mixture was melt-kneaded by a PCM twin screw extruder manufactured by Ikegai Ltd. with a screw aperture of 30 mm at a number of revolution of screw of 200 rpm at a charge of 10 kg/hr at an extruder temperature of 190° C. The molten resin extruded from a strand die was drawn while cooled and solidified in a cooling water bath, and cut by a strand cutter into a diameter of about 2 mm and a length of about 3 mm to obtain a resin composition.

Using the obtained resin composition as a material for interlayer, a polypropylene based heat shrinkable film consisting of three layers was formed by the above described method. The minimum preheat temperature at which orientation was possible was 50° C. The evaluation results of the obtained heat shrinkable film are shown in Table 6.

Example 4

A polypropylene based heat shrinkable film consisting of three layers was obtained in the same manner as in Example 3 except that the pellets PP-2 were used instead of the pellets PP-1. The minimum preheat temperature at which orientation was possible was 55° C. The evaluation results of the obtained heat shrinkable film are shown in Table 6.

Comparative Example 4

A polypropylene based heat shrinkable film consisting of three layers was obtained in the same manner as in Example 3 except that the pellets PP-3 were used instead of the pellets PP-1. The minimum preheat temperature at which orientation was possible was 55° C. The evaluation results of the obtained heat shrinkable film are shown in Table 6.

The tan δ curve of PP-3 had a plurality of peaks, which indicates that the film was poor in transparency. Further, the film was also poor in the heat shrinkage factor.

Comparative Example 5

A polypropylene based heat shrinkable film consisting of three layers was obtained in the same manner as in Example 3 except that the pellets PP-4 were used instead of the pellets PP-1. The minimum preheat temperature at which orientation was possible was 60° C. The evaluation results of the obtained heat shrinkable film are shown in Table 6.

Since the pellets PP-4 were obtained by using a random copolymer, not a block copolymer, the film was poor in the heat shrinkage factor was compared with Examples.

Comparative Example 6

A polypropylene based heat shrinkable film consisting of three layers was obtained in the same manner as in Example 3 except that the pellets PP-5 were used instead of the pellets PP-1. The minimum preheat temperature at which orientation was possible was 60° C. The evaluation results of the obtained heat shrinkable film are shown in Table 6.

Since the pellets PP-5 produced by using a Zeigler-Natta catalyst were used, the film was poor in the heat shrinkage factor as compared with Examples.

TABLE 6

| Alicyclic hydrocarbon resin | | Ex. 3 PP-1 25 w % | Ex. 4 PP-2 25 w % | Comp. Ex. 4 PP-3 25 w % | Comp. Ex. 5 PP-4 25 w % | Comp. Ex. 6 PP-5 25 w % |
|---|---|---|---|---|---|---|
| Thickness | μm | 60 | 60 | 60 | 60 | 60 |
| Haze | % | 5.9 | 6.0 | 22.1 | 5.0 | 5.0 |
| Heat shrinkage factor % | 80° C. | 35.0 | 33.0 | 20.5 | 24.0 | 11.5 |
| | 90° C. | 51.0 | 48.5 | 35.4 | 41.5 | 22.2 |
| | 100° C. | 64.0 | 61.3 | 46.5 | 52.5 | 33.0 |
| Density | g/cm³ | 0.915 | 0.916 | 0.915 | 0.916 | 0.915 |

(Consideration in Comparison between Examples and Comparative Examples)

A polypropylene based heat shrinkable film formed by using a novel propylene-ethylene block copolymer (A) which satisfies the respective definitions of the present invention, under forming conditions which satisfy definitions of the present invention, is very excellent in transparency and flexibility, and further, the product is free from blocking. Thus, it is understood that the respective definitions of the present invention are rationally demonstrated by experimental data.

In Comparative Examples 1 and 4, the tan δ curve of the propylene-ethylene block copolymer does not have a single peak, and the copolymer has a phase-separated structure, whereby the film has deteriorated transparency.

In Comparative Examples 2 and 5, a random copolymer catalyzed by a metallocene catalyst, not a propylene-ethylene block copolymer, is used. Blocking resistance of the film is not problematic, but the film is poor in flexibility since it is not obtained by using a block copolymer.

In Comparative Examples 3 and 6, since the propylene-ethylene block copolymer (A) is not a copolymer catalyzed by a metallocene catalyst, the film has deteriorated blocking resistance.

As mentioned above, as compared with a polypropylene based heat shrinkable film obtained by using a propylene-ethylene block copolymer (A) which is excellent in various properties such as transparency, flexibility and heat shrinkability, and which causes less blocking, and which thereby satisfies definitions of the present invention, products in Comparative Examples are inferior in quality.

The entire disclosures of Japanese Patent Application No. 2005-160370 filed on Apr. 29, 2005 and Japanese Patent Application No. 2005-160371 filed on Apr. 29, 2005 including specifications, claims, drawings and summaries are incorporated herein by reference in their entireties.

The invention claimed is:

1. A polypropylene based heat shrinkable film comprising a propylene-ethylene block copolymer (A), and having heat shrinkability imparted by orientation in at least one direction:
   wherein at least prior to melt extrusion of the propylene-ethylene block copolymer (A) into the film and the orientation in at least one direction, the propylene-ethylene block copolymer (A) satisfies the following requirements (A-i) to (A-iv)
   (A-i) it is a propylene-ethylene block copolymer obtained through sequential polymerization catalyzed by a metallocene catalyst which is composed of 30 to 95 wt % of a propylene homopolymer or propylene-ethylene random copolymer component (A1) having an ethylene content of at most 7 wt % produced in a first step and 70 to 5 wt % of a propylene-ethylene random copolymer component (A2) produced in a second step having an ethylene content higher by 3 to 20 wt% than that of the component (A1); wherein the sequential polymerization comprises the first step of polymerizing propylene, and optionally up to at most 7% of ethylene, in the presence of the metallocene catalyst to produce propylene homopolymer or propylene-ethylene random copolymer component (A1); followed by the second step of copolymerizing, in the presence of component (A1), propylene and ethylene in the presence of the metallocene catalyst, wherein the content of ethylene in the second step is higher than the ethylene content in the first step by an amount of 3 to 20wt %, to provide propylene-ethylene random copolymer component (A2);

(A-ii) it has a melt flow rate (MFR: 2.16 kg, 230° C.) within a range of 0.1 to 30 g/10 min;

(A-iii) a temperature-loss tangent (tan δ) curve obtained by dynamic mechanical analysis (DMA) has a single peak at a temperature of at most 0° C.;

(A-iv) in a temperature rising elution fractionation (TREF) curve obtained as a plot of an elution amount (dwt%/dT) to a temperature by means of temperature rising elution fractionation (TREF) using an o-dichlorobenzene solvent in a temperature range of −15° C. to 140° C., a peak temperature T(A1) observed at a high temperature side is within a range of 60° C. to 88° C., a peak temperature T(A2) observed at a low temperature side is at most 40° C. or a peak temperature T(A2) is not observed, and a temperature T(A4) at which 99 wt% of the total amount of the propylene-ethylene block copolymer is eluted is less than 90° C.

2. The polypropylene based heat shrinkable film according to claim 1, wherein the propylene-ethylene block copolymer (A) satisfies the following requirement (A-v):

(A-v) the amount W(Mw<5,000) of a component having a molecular weight of at most 5,000, as obtained by gel permeation chromatography (GPC), is at most 0.6 wt % to the total amount of the component (A).

3. The polypropylene based heat shrinkable film according to claim 1, wherein the propylene-ethylene block copolymer (A) satisfies the following requirement (A-vi):

(A-vi) the component (A1) obtained in the first step is a propylene-ethylene random copolymer having an ethylene content of 0.5 to 6 wt % and its proportion is 30 to 85 wt% to the total copolymer, and the component (A2) obtained in the second step is a propylene-ethylene random copolymer having an ethylene content higher by 6 to 18 wt% than that of the component (A1) and its proportion is 70 to 15 wt% to the total copolymer.

4. The polypropylene based heat shrinkable film according to claim 1, wherein the propylene-ethylene block copolymer (A) satisfies the following requirement (A-vii):

(A-vii) the component (A1) obtained in the first step is a propylene-ethylene random copolymer having an ethylene content of 1.5 to 6 wt% and its proportion is 30 to 70 wt% to the total copolymer, and the component (A2) obtained in the second step is a propylene-ethylene random copolymer having an ethylene content higher by 8 to 16 wt% than that of the component (A1) and its proportion is 70 to 30 wt% to the total copolymer.

5. The polypropylene based heat shrinkable film according to claim 1, which is oriented at a temperature lower by at least 20° C. than the melting temperature as measured by DSC of the propylene-ethylene block copolymer (A).

6. The polypropylene based heat shrinkable film according to claim 1, which is oriented at least uniaxially by a Tenter method.

7. The polypropylene based heat shrinkable film according to claim 1, which is biaxially oriented by blown film extrusion.

8. A polypropylene based multi-layer heat shrinkable film comprising a propylene-ethylene block copolymer (A), and having heat shrinkability imparted by orientation in at least one direction:

wherein at least prior to melt extrusion of the propylene-ethylene block copolymer (A) into the film and the orientation in at least one direction, the propylene-ethylene block copolymer (A) satisfies the following requirements (A-i) to (A-iv)

(A-i) it is a propylene-ethylene block copolymer obtained through sequential polymerization catalyzed by a metallocene catalyst which is composed of 30 to 95 wt% of a propylene homopolymer or propylene-ethylene random copolymer component (A1) having an ethylene content of at most 7 wt% produced in a first step and 70 to 5 wt% of a propylene-ethylene random copolymer component (A2) produced in a second step having an ethylene content higher by 3 to 20 wt% than that of the component (A1) ; wherein the sequential polymerization comprises the first step of polymerizing propylene, and optionally up to at most 7% of ethylene, in the presence of the metallocene catalyst to produce propylene homopolymer or propylene-ethylene random copolymer component (A1); followed by the second step of copolymerizing, in the presence of component (A1), propylene and ethylene in the presence of the metallocene catalyst, wherein the content of ethylene in the second step is higher than the ethylene content in the first step by an amount of 3 to 20wt%, to provide propylene-ethylene random copolymer component (A2);

(A-ii) it has a melt flow rate (MFR: 2.16 kg, 230° C.) within a range of 0.1 to 30 g/10 mm;

(A-iii) a temperature-loss tangent (tan δ) curve obtained by dynamic mechanical analysis (DMA) has a single peak at a temperature of at most 0° C.;

(A-iv) in a temperature rising elution fractionation (TREF) curve obtained as a plot of an elution amount (dwt%/dT) to a temperature by means of temperature rising elution fractionation (TREF) using an o-dichlorobenzene solvent in a temperature range of −15° C. to 140° C., a peak temperature T(A1) observed at a high temperature side is within a range of 60° C. to 88° C., a peak temperature T(A2) observed at a low temperature side is at most 40° C. or a peak temperature T(A2) is not observed, and a temperature T(A4) at which 99 wt% of the total amount of the propylene-ethylene block copolymer is eluted is less than 90° C.

9. The polypropylene based multi-layer heat shrinkable film according to claim 8, wherein the propylene-ethylene block copolymer (A) satisfies the following requirement (A-v):

(A-v) the amount W(Mw<5,000) of a component having a molecular weight of at most 5,000, as obtained by gel permeation chromatography (GPC), is at most 0.6 wt% to the total amount of the component (A).

10. The polypropylene based multi-layer heat shrinkable film according to claim 8, wherein the propylene-ethylene block copolymer (A) satisfies the following requirement (A-vi):

(A-vi) the component (A1) obtained in the first step is a propylene-ethylene random copolymer having an ethylene content of 0.5 to 6 wt% and its proportion is 30 to 85 wt% to the total copolymer, and the component (A2) obtained in the second step is a propylene-ethylene random copolymer having an ethylene content higher by 6 to 18 wt% than that of the component (A1) and its proportion is 70 to 15 wt% to the total copolymer.

11. The polypropylene based multi-layer heat shrinkable film according to claim 8, wherein the propylene-ethylene block copolymer (A) satisfies the following requirement (A-vii):

(A-vii) the component (A1) obtained in the first step is a propylene-ethylene random copolymer having an ethylene content of 1.5 to 6 wt% and its proportion is 30 to 70 wt% to the total copolymer, and the component (A2) obtained in the second step is a propylene-ethylene random copolymer having an ethylene content higher by 8 to 16 wt% than that of the component (A1) and its proportion is 70 to 30 wt% to the total copolymer.

12. The polypropylene based multi-layer heat shrinkable film according to claim 8, which is oriented at a temperature lower by at least 20° C. than the melting temperature as measured by DSC of the propylene-ethylene block copolymer (A).

13. The polypropylene based multi-layer heat shrinkable film according to claim 8, which is oriented at least uniaxially by a Tenter method.

14. The polypropylene based multi-layer heat shrinkable film according to claim 8, which is biaxially oriented by blown film extrusion.

* * * * *